(12) United States Patent
Beale et al.

(10) Patent No.: US 11,736,243 B2
(45) Date of Patent: *Aug. 22, 2023

(54) METHODS, INFRASTRUCTURE EQUIPMENT AND COMMUNICATIONS DEVICE

(71) Applicant: Sony Group Corporation, Tokyo (JP)

(72) Inventors: Martin Warwick Beale, Basingstoke (GB); Shin Horng Wong, Basingstoke (GB)

(73) Assignee: SONY GROUP CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/693,443

(22) Filed: Mar. 14, 2022

(65) Prior Publication Data

US 2022/0200745 A1 Jun. 23, 2022

Related U.S. Application Data

(63) Continuation of application No. 16/967,743, filed as application No. PCT/EP2019/053590 on Feb. 13, 2019, now Pat. No. 11,310,001.

(30) Foreign Application Priority Data

Feb. 15, 2018 (EP) .................................. 18157018

(51) Int. Cl.
*H04L 5/00* (2006.01)
*H04W 4/70* (2018.01)
(Continued)

(52) U.S. Cl.
CPC ............ *H04L 5/001* (2013.01); *H04L 5/0041* (2013.01); *H04W 4/70* (2018.02);
(Continued)

(58) Field of Classification Search
CPC ..... H04L 5/001; H04L 5/0037; H04L 5/0041; H04L 5/0051; H04L 5/0053;
(Continued)

(56) References Cited

U.S. PATENT DOCUMENTS

2014/0198772 A1 7/2014 Baldemair et al.
2016/0219514 A1 7/2016 Wu et al.
(Continued)

FOREIGN PATENT DOCUMENTS

JP 2015507889 A 3/2015
WO 2018/202751 A1 11/2018
(Continued)

OTHER PUBLICATIONS

International Search Report and Written Opinion dated May 24, 2019 for PCT/EP2019/053590 filed on Feb. 13, 2019, 17 pages.
(Continued)

*Primary Examiner* — Gary Mui
(74) *Attorney, Agent, or Firm* — Xsensus LLP

(57) ABSTRACT

A method of operating an infrastructure equipment configured for communicating with one or more communications devices via a wireless access interface. The wireless access interface comprises resource elements for carrying sub-carriers of Orthogonal Frequency Division Multiplexed (OFDM) symbols. Forming a downlink signal comprises selecting a plurality of component-signals from a set of component-signals, each of the component-signals from the set of component-signals being formed from a sequence of signal samples for transmission in one of the blocks of resource elements and in one of the time units by the number of OFDM symbols, each of the component-signals being detectable by a narrow bandwidth receiver, and selecting for each of the plurality of component-signals one or more of
(Continued)

the plurality of the blocks of resource elements and one or more of the time units to transmit the component-signal.

20 Claims, 14 Drawing Sheets

(51) Int. Cl.
*H04W 52/02* (2009.01)
*H04W 72/121* (2023.01)
*H04W 72/1273* (2023.01)
*H04W 72/54* (2023.01)

(52) U.S. Cl.
CPC ... *H04W 52/0216* (2013.01); *H04W 52/0219* (2013.01); *H04W 52/0229* (2013.01); *H04W 72/121* (2013.01); *H04W 72/1273* (2013.01); *H04W 72/54* (2023.01)

(58) Field of Classification Search
CPC ............ H04L 5/0064; H04W 52/0216; H04W 52/0219; H04W 52/0229; H04W 52/028; H04W 72/121; H04W 72/1226; H04W 72/1273

See application file for complete search history.

(56) References Cited

U.S. PATENT DOCUMENTS

| | | | |
|---|---|---|---|
| 2017/0026219 | A1 | 1/2017 | Atungsiri |
| 2017/0026220 | A1 | 1/2017 | Atungsiri |
| 2017/0026221 | A1 | 1/2017 | Atungsiri |
| 2017/0332327 | A1 | 11/2017 | Fang |
| 2018/0184379 | A1 | 6/2018 | Liu et al. |
| 2020/0037251 | A1 | 1/2020 | Du et al. |
| 2020/0068653 | A1 | 2/2020 | Li et al. |
| 2020/0163018 | A1 | 5/2020 | Wilhelmsson et al. |
| 2020/0252907 | A1 | 8/2020 | Rune |

FOREIGN PATENT DOCUMENTS

| | | | |
|---|---|---|---|
| WO | 2019/030337 | A1 | 2/2019 |
| WO | 2019/096704 | A1 | 5/2019 |

OTHER PUBLICATIONS

3PP, "LTE; Evolved Universal Terrestrial Radio Access (E-UTRA); Medium Access Control (MAC) protocol specification," 3GPP TS 36.321 version 13.5.0 Release 13, ETSI TS 136 321 V13.5.0, Apr. 2017, pp. 1-95.
3GPP, "LTE; Evolved Universal Terrestrial Radio Access (E-UTRA); User Equipment (UE) procedures in idle mode," 3GPP TS 36.304 version 14.2.0 Release 14, ETSI TS 136 304 V14.2.0, Apr. 2017, pp. 1-51.
Ericsson and Qualcomm, "New WID on Even further enhanced MTC for LTE," 3GPP TSG RAN Meeting No. 75, RP-170732 (revision of RP-170465), Dubrovnik, Croatia, Mar. 6-9, 2017, 4 pages.
Ericsson, "Revised WID for Further Enhanced MTC for LTE," 3GPP TSG RAN Meeting No. 73, RP-161464, revision of RP-161321, New Orleans, USA, Sep. 19-22, 2016, 6 pages.
Hambeck, C., et al., "A2.4μW Wake-up Receiver for Wireless Sensor Nodes with -71dBm Sensitivity," IEEE Proceedings of International Symposium of Circuits and Systems (ISCAS), IEEE, 2011, pp. 534-537.
Holma, H. and Toskala, A., "System Architecture Based on 3GPP SAE," LTE for UMTS: OFDMA and SC-FDMA Based Radio Access, John Wiley & Sons, Ltd., Apr. 2009, pp. 25-27.
Huawei and Hisilicon, "Considerations on 'wake-up signal' for eFeMTC," 3GPP TSG RAN WG1 Meeting No. 88bis, R1-1704282, Spokane, USA, Apr. 3-7, 2017, 4 pages.
Huawei and Hisilicon, "On 'wake-up signal' for eFeMTC," 3GPP TSG RAN WG1 Meeting No. 91, R1-1719463, Reno, USA, Nov. 27-Dec. 1, 2017, 6 pages.
Huawei and Hisilicon, "Revised work item proposal: Enhancements of NB-IoT," 3GPP TSG RAN Meeting No. 73, RP-161901, revision of RP-161324, New Orleans, USA, Sep. 19-22, 2016, 8 pages.
Huawei, et al., "New WID on Further NB-IoT enhancements," 3GPP TSG RAN Meeting No. 75, RP-170852, Dubrovnik, Croatia, Mar. 6-9, 2017, 6 pages.
LG Electronics, "Discussion on wake up signal in MTC," 3GPP TSG RAN WG1 Meeting 91, R1-1719875, Reno, USA, Nov. 27-Dec. 1, 2017, 7 pages.
Mazloum, N. S., and EDFORS, O., "Performance analysis and energy optimization of wake-up receiver schemes for wireless low-power applications," IEEE Transactions on Wireless Communications, Dec. 2014, pp. 1-12.
Nokia and Nokia Shanghai Bell, "Considerations for design of wake-up signal," 3GPP TSG RAN WG1 Meeting No. 90bis, R1-1717228, Prague, Czech Republic, Oct. 9-13, 2017, 4 pages.
Qualcomm Incorporated, "Efficient monitoring of DL control channels," 3GPP TSG RAN WG1 Meeting No. 91, R1-1720417, Reno, USA, Nov. 27-Dec. 1, 2017, pp. 1-11.
Samsung, "Discussion on Wake up signal configuration," 3GPP TSG RAN WG1 Meeting 91, R1-1720264, Reno, USA, Nov. 27-Dec. 1, 2017, 5 pages.
Sequans Communications, "Discussion on wake-up signal for power consumption reduction forfeNB-IoT," 3GPP TSG-RAN WG1 No. 89, R1-1709161, Hangzhou, China, May 15-19, 2017, 4 pages.
Sierra Wireless, "Idle Mode Power Efficiency Reduction," 3GPP TSG RAN WG1 Meeting No. 89, R1-1708311, Hangzhou, P.R. China, May 15-19, 2017, 6 pages.
Zte and Sanechips, "Power consumption reduction for physical channels for MTC," 3GPP TSG RAN WG1 Meeting No. 91, R1-1719728, Reno, USA, Nov. 27-Dec. 1, 2017, 4 pages.
Zte, "Details design of wake up signal for NB-IoT," 3GPP TSG RAN WG1 Meeting No. 91, R1-1719725, Reno, USA, Nov. 27-Dec. 1, 2017, 4 pages.

order of NB-IoT WUS sequences used to create eMTC WUS sequence depends on cell ID Time arrangement of NB-IoT WUS sequences used to create eMTC WUS sequence is different between cells order of NB-IoT WUS sequences used to create eMTC WUS sequence depends on sub-group

*order of NB-IoT WUS sequences used to create eMTC WUS sequence depends on sub-group, allowing more than one sub-group to be paged at the same time*

METHODS, INFRASTRUCTURE EQUIPMENT AND COMMUNICATIONS DEVICE

CROSS REFERENCE TO RELATED APPLICATIONS

This application is a continuation of U.S. application Ser. No. 16/967,743, filed Aug. 6, 2020, which is based on PCT filing PCT/EP2019/053590, filed Feb. 13, 2019, which claims priority to EP 18157018.5, filed Feb. 15, 2018, the entire contents of each are incorporated herein by reference.

BACKGROUND

Field of Disclosure

The present disclosure relates to infrastructure equipment and communications devices of wireless communications systems, where infrastructure equipment are configured to transmit Wake-Up Signals (WUSs) in advance of transmitting downlink messages to communications devices.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to support efficiently communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. eMTC communications devices have a wider bandwidth than NB-IoT communications devices which are configured to operate with a narrower band receiver. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data. In some examples the receiver is configured to receive signals within a single physical resource block.

The increasing use of different types of communications devices associated with different traffic profiles gives rise to new challenges for efficiently handling communications in wireless telecommunications systems that need to be addressed.

SUMMARY OF THE DISCLOSURE

The present disclosure can help address or mitigate at least some of the issues discussed above. Embodiments of the present technique can provide a method of operating an infrastructure equipment which forms part of a wireless communications network, the infrastructure equipment being configured for communicating with one or more communications devices. The method comprises forming a downlink signal for transmission via a wireless access interface, the wireless access interface comprising in a frequency dimension resource elements for carrying sub-carriers of Orthogonal Frequency Division Multiplexed (OFDM) symbols, the resource elements being formed in the frequency dimension into a plurality of blocks of resource elements, and in a time dimension the wireless access interface is divided into time units, each of the time units for carrying a number of OFDM symbols. The time units may be for example sub-frames of the wireless access interface. The forming of the downlink signal comprises selecting a plurality of component-signals from a set of component-signals, each of the component-signals from the set of component-signals being formed from a sequence of signal samples for transmission in one of the blocks of resource elements and in one of the time units by the number of OFDM symbols, each of the component-signals being detectable by a narrow bandwidth receiver, and selecting for each of the plurality of component-signals one or more of the plurality of the blocks of resource elements and one or more of the time units to transmit the component-signal. The sequence of signal samples may be for example a narrow band Internet of Things Wake-up Signal (NB-IoT WUS) formed for example from a Zadoff-Chu sequence and carried by a number of OFDM symbols in one of the blocks of resource elements of the wireless access interface. In one example, the plurality of component-signals can be used to form a wider bandwidth wake-up signal such as one which might be used for an eMTC device.

Embodiments of the present technique can provide wireless communications systems in which a signal is composed of a plurality of constituent narrow band signal sequences (component-signals), where the arrangement of the NB-IoT WUS sequences can provide either improved robustness to intercell interference between cells or an improved operation efficiency at different coupling losses (different path losses caused by different radio communication conditions) or better grouping of UEs. According to example embodiments a wider bandwidth downlink signal, such as a wake-up signal (WUS) is formed from a narrow band downlink signal which is used for the same purpose for other narrow band devices (NB-IoT device) such as an NB-IoT WUS.

Embodiments of the present technique, which further relate to infrastructure equipment, communications devices, methods of operating communications devices and infrastructure equipment and circuitry for communications devices and infrastructure equipment, allow for a Wake-Up Signal.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Advanced Radio Access Technology (4G)

Figure 1:
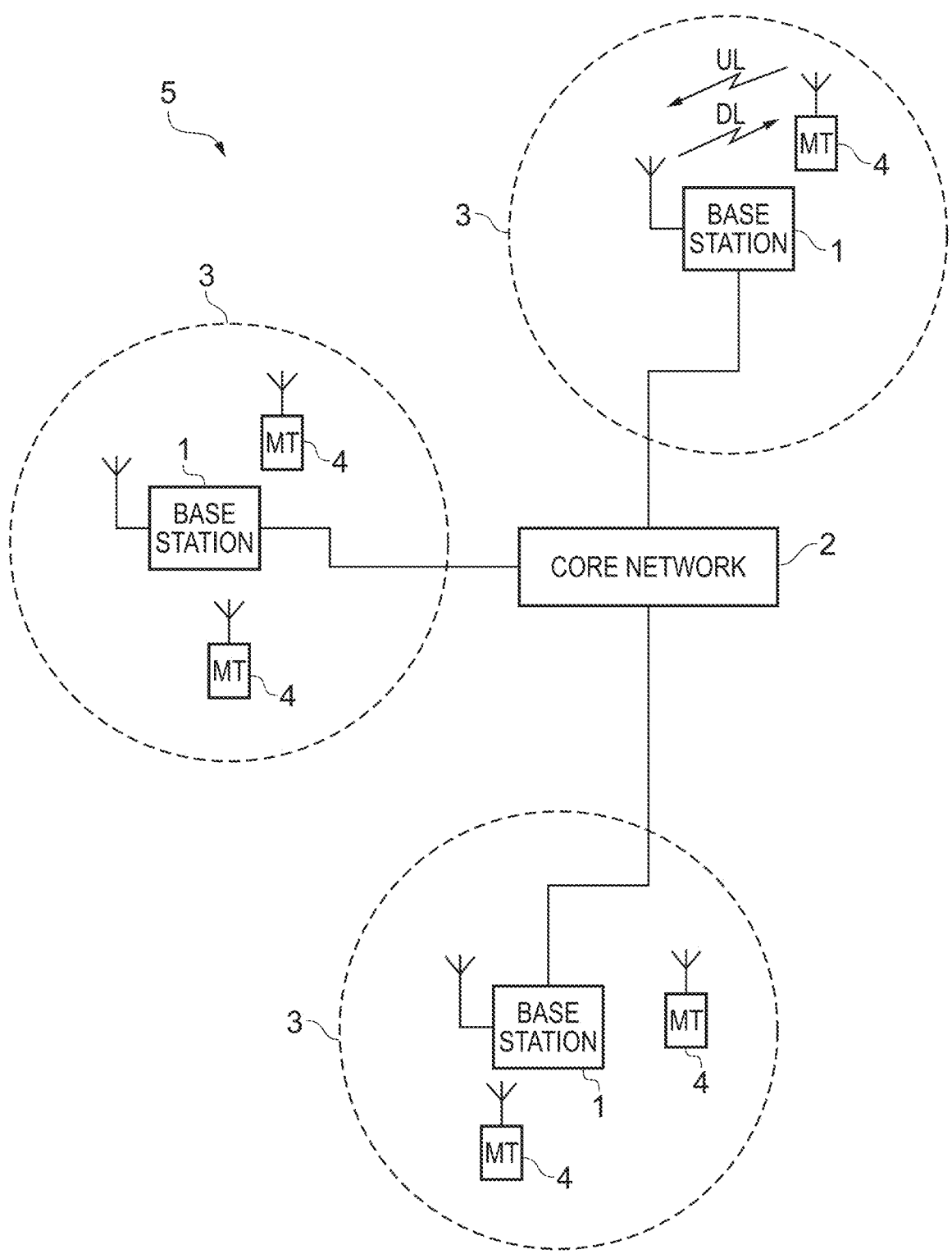
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 5 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 5 includes a plurality of base stations 1 connected to a core network 2. Each base station provides a coverage area 3 (i.e. a cell) within which data can be communicated to and from communications devices 4. Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
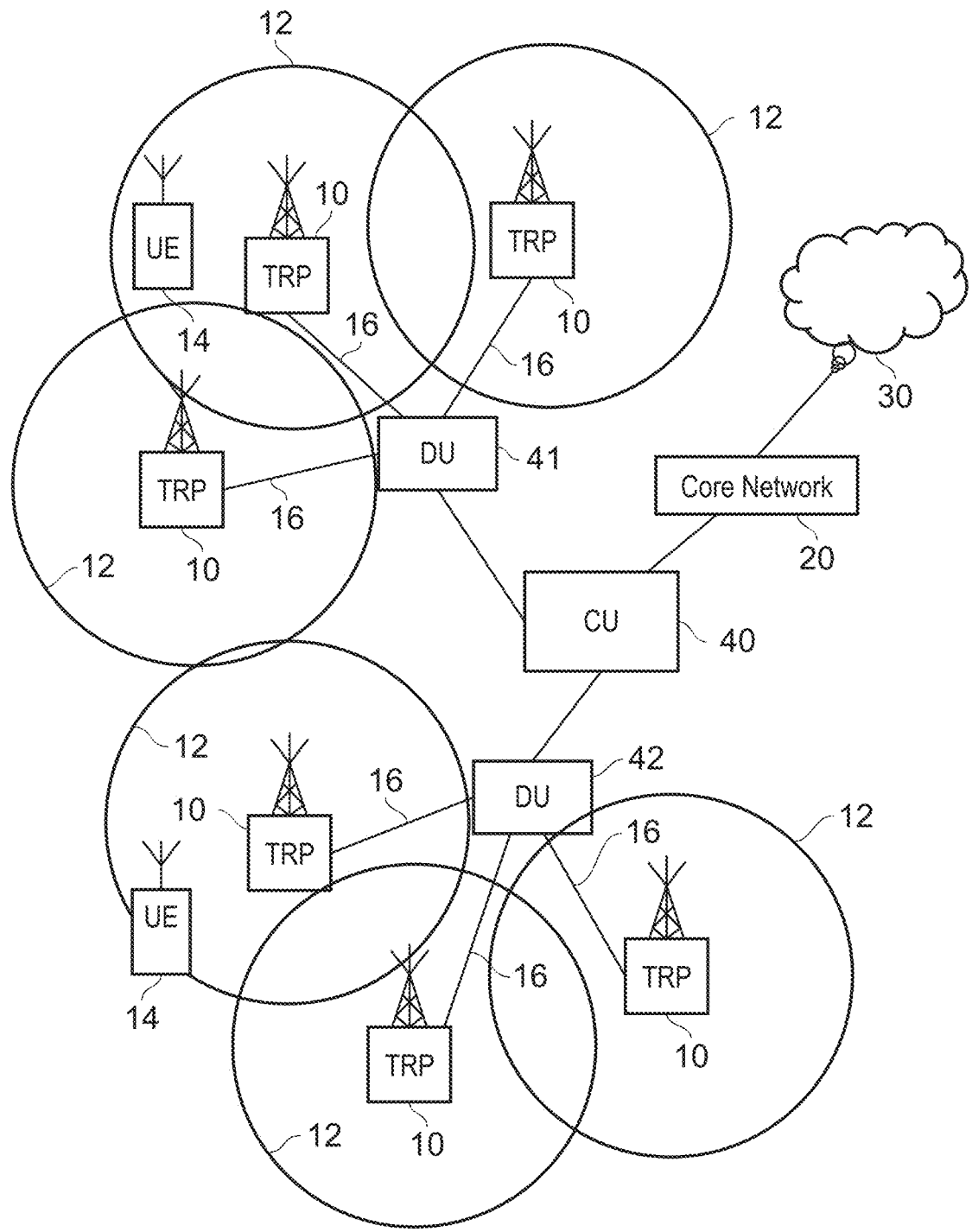
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by circles 12. As such wireless communications devices 14 which are within a radio communications range provided by the cells 12 can transmit and receive signals to and from the TRPs 10 via the wireless access interface. Each of the distributed control units 41, 42 are connected to a central unit (CU) 40 via an interface. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to UE devices known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network component 20 of the new RAT telecommunications system represented in FIG. 2 may be broadly considered to correspond with the core network 2 represented in FIG. 1, and the respective controlling nodes 40 and their associated distributed units/TRPs 10 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/centralised unit and/or the distributed units/TRPs. A communications device 14 is represented in FIG. 2 within the coverage area of the first communication cell 12. This communications device 14 may thus exchange signalling with the first controlling node 40 in the first communication cell 12 via one of the distributed units 41, 42 associated with the first communication cell 12.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Paging Communications Devices

As is well understood, various wireless telecommunications networks, such as the LTE-based network represented in FIG. 1 and the NR-based network represented in FIG. 2, may support different Radio Resource Control (RRC) modes for UEs, typically including: (i) RRC idle mode (RR- C_IDLE); and (ii) RRC connected mode (RRC_CONNECTED). When a UE transmits data, RRC connected mode is generally used. The RRC idle mode, on the other hand, is for UEs which are registered to the network (EMM-REGISTERED), but not currently in active communication (ECM-IDLE). Thus, generally speaking, in RRC connected mode a UE is connected to a radio network access node (e.g. an LTE base station) in the sense of being able to exchange user plane data with the radio network access node. Conversely, in RRC idle mode a UE is not connected to a radio network access node in the sense of not being able to communicate user plane data using the radio network access node. In idle mode the UE may still receive some communications from base stations, for example reference signalling for cell reselection purposes and other broadcast signalling. The RRC connection setup procedure of going from RRC idle mode to RRC connected mode may be referred to as connecting to a cell/base station.

For a UE in RRC idle mode the core network is aware that the UE is present within the network, but the radio access network (RAN) part (comprising radio network infrastructure equipment such as the base stations 1 of FIG. 1 and/or the combined TRPs/CUs 10, 40, 42 of FIG. 2) is not. The core network is aware of the location of idle mode UEs at a paging tracking area level but not at the level of individual transceiver entities. The core network will generally assume a UE is located within the tracking area(s) associated with a transceiver entity most recently used for communicating with the UE, unless the UE has since provided a specific tracking area update (TAU) to the network. (As is conventional, idle mode UEs are typically required to send a TAU when they detect they have entered a different tracking area to allow the core network to keep track of their location). Because the core network tracks UEs at a tracking area level, it is generally not possible for the network infrastructure to know which specific transceiver entities (radio network node) to use when seeking to initiate contact with a UE in idle mode. Consequently, and as is well known, when a core network is required to connect to an idle mode UE a paging procedure is used.

In a typical currently deployed network, idle mode UEs are configured to monitor for paging messages periodically. For UEs operating in a discontinuous reception (DRX) mode this occurs when they wake up for their DRX awake time. Paging signals for a specific UE are transmitted in defined frames (Paging Frames)/sub-frames (Paging Occasions) which for a given UE may be derived from the International Mobile Subscriber Identifier (IMSI) of the UE, as well as paging related DRX parameters established in system information transmitted within the network.

In a conventional system, a UE thus receives and checks the contents of specific sub-frames (paging occasions) in specific frames (paging frames) to look for paging signalling. For example, in accordance with the standards set out in 3GPP TS 36.304 version 14.2.0 Release 14 [6], a Paging Frame (PF) is a downlink radio frame which may contain one or more Paging Occasion(s) (PO), where a Paging Occasion is a sub-frame where there may be P-RNTI transmitted on PDCCH (or equivalent depending channel on implementation, e.g. on MPDCCH for MTC or for NB-IOT on NPDCCH) addressing the paging message. Paging messages are conveyed on a physical downlink shared channel (PDSCH) on resources identified from an allocation message addressed to a paging radio network temporary identifier (P-RNTI) and conveyed on a physical downlink control channel (PDCCH). P-RNTI is a common identifier for all UEs (e.g. set at FFFE in hexa-decimal for the standard defined by 3GPP TS 36.321 version 13.5.0 Release 13 [7]). All UEs check whether PDCCH at specific PFs/POs configured for their use include P-RNTI or not. If there is a PDSCH allocation addressed to P-RNTI in the relevant subframe, the UE proceeds to seek to receive and decode the paging messages transmitted on the allocated resources on PDSCH. The UE then checks the list of IDs contained in the paging record list in the received paging message, to determine whether the list contains an ID corresponding to itself (for example P-TMSI or IMSI), and if so initiates a paging response.

Although the above description has summarised an example existing LTE paging procedure, it is expected that broadly similar principles may be adopted for future wireless telecommunications networks based on newer radio access technologies (RATs), such as 5G networks. The above-description of a paging procedure has referred to specific channel names which are commonly used in LTE, such as PDCCH and PDSCH, and this terminology will be used throughout this description for convenience, it being appreciated that in certain implementations different channel names may be more common. For example in the context of a wireless telecommunications system having dedicated channels for communicating with certain types of UEs, for example MTC devices, it may be expected the corresponding channel names may be modified. For example, a physical downlink control channel dedicated for MTC devices may be referred to as MPDCCH.

In proposed approaches for eNB-IoT and feMTC in accordance with 3GPP release 14 a UE in DRX in idle mode is required to decode PDCCH (or equivalent downlink control channel for the specific implementation at hand) to identify if there are resources scheduled on PDSCH (or equivalent downlink shared channel for the specific implementation at hand) for a paging message during paging occasions in which the UE might receive a paging message.

Figure 3:
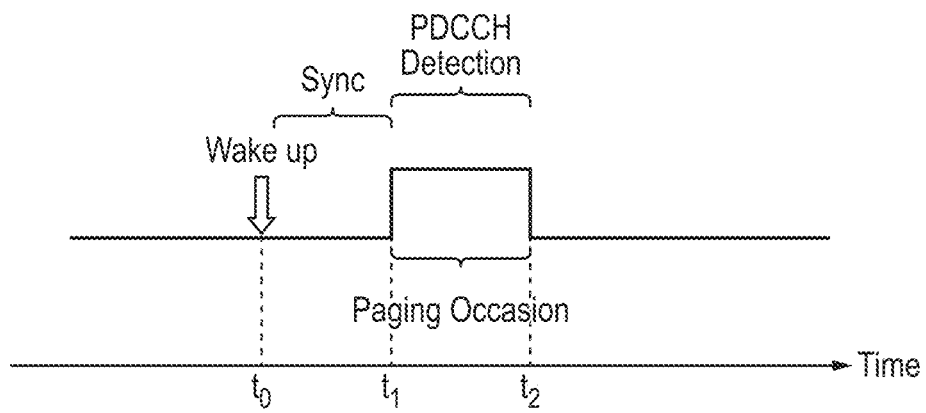
FIGS. 3 and 4 schematically represent time lines associated with paging occasions in wireless telecommunication systems based on known approaches.

FIG. 3 schematically represents a timeline of a paging occasion for a UE operating in a known wireless telecommunications system. In the example shown in FIG. 3, one paging occasion is shown and extends from time t1 to t2. As is conventional, paging occasions for a UE will typically occur according to a regular repeating schedule having regard to the UE's currently configured DRX cycle. Different UEs may have different DRX cycle lengths, and so have different times between paging occasions. For a UE having a relatively long DRX cycle/time between paging occasions, it is possible the UE will to some extent lose synchronisation with the radio network infrastructure equipment of the telecommunications system between paging occasions. In this case it may be helpful for the UE to wake up in advance of the paging occasion to allow it to synchronise to the wireless telecommunications system prior to the paging occasion. An example of this is schematically shown in FIG. 3 in which the UE wakes up at time t0 so that it can synchronise with the wireless telecommunication system in the period between times t0 and t1 so that it is able to monitor/detect PDCCH during the configured paging occasion between t1 and t2. In this regard, the process of synchronisation might in some cases only require fine adjustments to frequency and/or timing tracking loops based on detection of CRS (cell-specific reference symbols), e.g. when DRX cycles (times between paging occasions) are relatively short, or a more significant degree of synchronisation may be needed, for example complete re-synchronisation by detecting PSS/SSS (primary synchronisation signals/secondary synchronisation signals) as well as using CRS, e.g. when DRX cycles (times between paging occasions) are relatively long (such that the frequency and timing of the UE may become significantly offset relative to that of the radio network infrastructure).

Once the UE has re-synchronised to the network, it will monitor PDCCH to determine if there is a paging message, and if so will go on to decode the PDSCH carrying the paging message in the usual way. If there is no paging message for the UE, the UE will go back to sleep (low power mode) until the next paging occasion. For certain types of UEs, such as MTC devices, it may be expected that paging will occur relatively rarely (e.g. once per day for a smart utility meter), and so in many cases the UE may wake up and synchronise to the network to monitor PDCCH by blind decoding for a paging message when in fact there is no paging message for the UE. This represents an undesirable "waste" of resources, for example battery power, for the UE.

Wake-Up Signal (WUS)

Proposed approaches for eNB-IoT and feMTC in accordance with 3GPP release 15 share several common objectives, and one of these objectives is to reduce power consumption associated with monitoring for paging messages by introducing what is referred to as a wake-up signal (WUS) (e.g. of the type described in C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537 [8]). The proposed WUS is carried on a new physical channel and is intended to allow UEs to determine whether or not they need to actually decode PDCCH in an upcoming paging occasion. That is to say, whereas in accordance with previously proposed techniques a UE is required to decode PDCCH during every paging occasion to determine if there is a paging message, and if so to decode PDSCH to determine if the paging message is addressed to the UE, the WUS is instead intended to indicate to the UE whether or not the next paging occasion contains a paging message that the UE should decode. A WUS is transmitted at a pre-determined/derivable time in advance of a scheduled paging occasion such that a UE knows when to seek to receive a WUS and may contain relatively little information so that it can be decoded quickly (as compared to the blind decoding needed for PDCCH). For example, in some implementations the WUS may include a one-bit indication of whether or not there will be a paging message transmitted in the upcoming paging occasion or the presence of a WUS would indicate an upcoming paging message whilst an absence of a WUS would indicate there is no subsequent paging message. If the WUS indicates the upcoming paging occasion does include a paging message, any UEs for which that paging occasion applies may proceed to decode the paging message as normal to determine if the paging message is addressed to it. If the WUS indicates the upcoming paging occasion does not include any paging message, any UE for which that paging occasion applies can determine from this that it does not need to monitor for a paging message during the upcoming paging occasion, and so can, for example, return to a low power mode. In some implementations the WUS may include an identifier for a UE that is going to be paged in the paging occasion. This identifier may identify an individual UE or may identify a group of UEs. The WUS may include multiple identifiers for multiple UEs/groups. A UE which determines the WUS is associated with an identifier that applies to it may proceed to decode the paging message as normal. Conversely, a UE which determines the WUS is not associated with an identifier that applies to it may determine from this that it does not need to monitor for a paging message during the upcoming paging occasion and can, for example, return to a low power mode. The WUS may also be encoded with a format that enables low power decoding (e.g. the WUS may be a narrow bandwidth signal that can be decoded with low power using a low sampling rate receiver), and furthermore may be transmitted with a format that allows reliable decoding even with relatively poor synchronisation.

Figure 4:
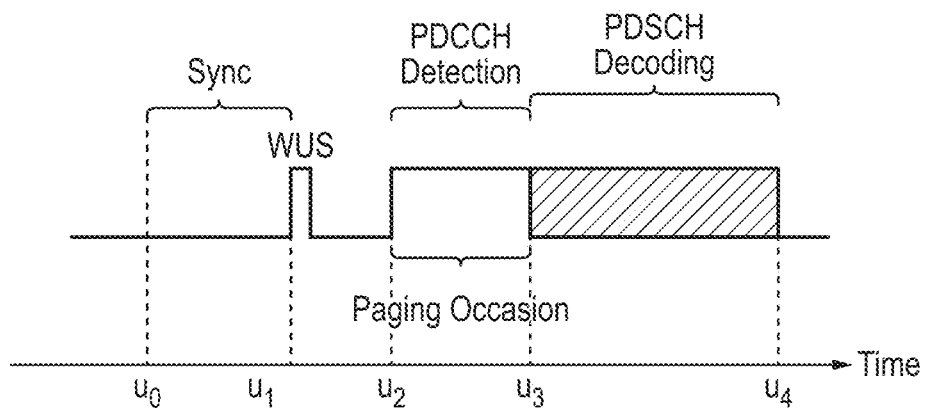

FIG. 4 schematically represents a timeline for a paging occasion for a UE operating in a wireless telecommunications system employing a WUS as proposed in association with 3GPP Release 15. In the example shown in FIG. 4, a paging occasion extends from time u2 to u3. As is conventional, the paging occasions will typically occur according to a regular repeating schedule having regard to the UE's currently configured DRX cycle.

If the paging occasion is not scheduled to include a PDCCH paging message transmission for a UE, then a WUS identifying that UE is not sent. Thus a UE may be configured to seek to detect a WUS associated with an identifier for the UE in advance of an upcoming paging occasion. If the UE detects a WUS associated with an identifier for itself, the UE can proceed to fine tune its frequency and timing tracking loops if required and blind detects for a PDCCH between times u2 and u3, followed by decoding of the PDSCH carrying the paging message between time u3 and u4 in the usual way. If, however, the UE fails to detect a WUS associated with an identifier for the UE, the UE may assume there is not going to be a paging message for the UE in the upcoming paging occasion, and so may go back to sleep (low power mode) and not decode PDCCH in the paging occasion. As noted above, in some other implementations, the WUS might not include any indication of any specific UE(s)/group(s), but may instead simply include an indication of whether or not an upcoming paging occasion includes any paging message.

Either way, by using WUS, a UE may be expected to consume less energy as it can help avoid unnecessary monitoring/blind decoding of PDCCH (or equivalent depending on the specific implementation at hand). It will be appreciated that WUS can also be used in connected mode when DRX is used.

An aspect of WUS transmission disclosed in our co-pending European patent applications 17186065.3[15] and 17169577.8 [10] concerns maintaining synchronisation of a UE to the wireless communications network when the UE has entered into a long DRX cycle, which can result in the UE losing synchronisation with the wireless communications network. If a UE is configured for a long DRX cycle (i.e. a relatively long time between paging occasions), there may be a significant likelihood the UE will lose synchronisation with the radio access network so that it is unable to decode WUS without first synchronising to the radio access network. An example of this is schematically shown in FIG. 4 whereby a UE configured for a relatively long DRX cycle may need to wake up at time u0 to allow time for it to synchronise to the radio access network before u1 so that it can detect any WUS signalling.

Figure 5:
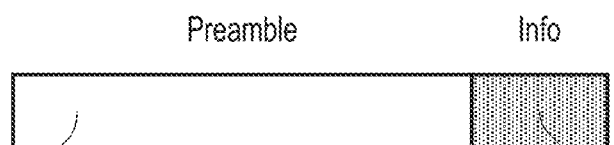
FIG. 5 schematically represents an example format for wake up signalling (WUS) that may be adapted for use in accordance with certain implementation examples.

FIG. 5 schematically represents an example format for wake up signals (WUS) that include a synchronisation preamble (predefined signature sequence) as described in [10]. Thus the WUS represented in FIG. 5 comprises a preamble part 50, which may be of a variable length, and an information ("Info") part 52. The preamble part 50 comprises signalling to allow UEs to achieve frequency and/or time synchronisation with the network (i.e. with the radio network infrastructure equipment transmitting the WUS), rather than using the sparsely distributed PSS/SSS (though it should be appreciated that this can still be optionally used in addition to the WUS preamble). The information part 52 comprises an indication of one or more UEs to which the WUS applies, e.g. a UE identifier and/or an identifier for a group of UEs. The UE/group identifier(s) may be network allocated identifiers (e.g. radio network temporary identifiers, RNTI) for the UE(s), or any other form of suitable identifier, e.g. based on an IMSI for a UE. It will be appreciated there are many modifications that may be made to the approaches set out above in relation to FIG. 5, as described in [10]. For example, the general format for the wake-up signalling may not conform to that shown in FIG. 5, but may have a different format, for example the WUS may not include an information bearing part 52.

Wake-Up Signal Sequences for IoT

The following paragraphs concern the design of the WUS according to one example which can be used for an IoT device. A WUS according to this example comprises $N_p$ WUS preamble symbols followed by $N_d$ WUS signalling symbols if needed. Each WUS OFDM preamble symbol comprises 3 parts:

Pseudo-random Sequence (PN)
Zadoff-Chu (ZC) sequence
Frequency shift function

The dot product of the PN and ZC sequences forms the WUS preamble sequence. Each WUS preamble symbol is constructed as an OFDM symbol in the frequency domain by mapping the elements of the WUS preamble sequence to the designated subcarriers of the OFDM symbol. For each WUS preamble OFDM symbol, the PN sequence is initialized by the Cell ID so that a WUS is linked to the cell and this would also randomize the WUS so that it is orthogonal to the WUS from other cells. The use of ZC sequences would provide good correlation properties at the UE receiver and low PAPR for the transmitted signal. The WUS preamble sequence for preamble symbol m, $X_m(k)$, is:

$$X_m(k) = P_m(k)Z(k)$$

where, $P_m(k)$ is the PN sequence, $Z(k)$ is the Zadoff-Chu sequence for k=0, 1, 2, ... $N_{SC}-1$ where $N_{SC}$ is the number of sub-carriers used for the WUS signal. In other words, in some embodiments of the present technique, the reference sequence comprises a dot product of a Zadoff-Chu sequence and a pseudo-random sequence.

The WUS preamble symbol is then formed by:

$$w_m(k) = x_m(k)e^{-ja_m k}$$

where $x_m(k)$ is the inverse Fourier transform of $X_m(k)$ and $a_m$ is a frequency shift component for preamble symbol m. In other words, in some embodiments of the present technique, the frequency shifting of the one or more OFDM symbols comprises multiplying an inverse Fourier transform of the reference sequence with a complex exponential of an appropriate phase sequence. Each preamble symbol, is then prefixed by a cyclic prefix of $N_g$ samples.

Figure 6:
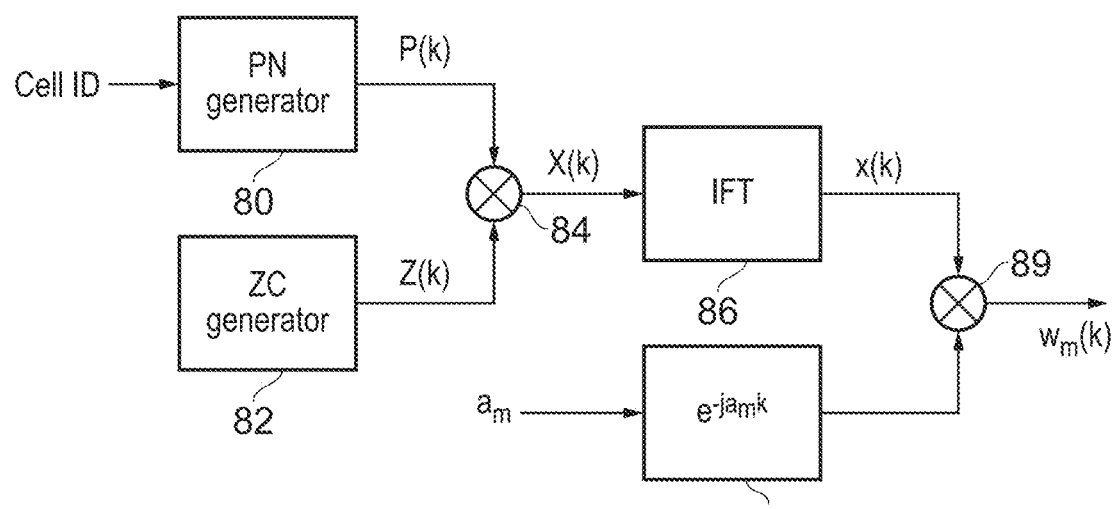
FIG. 6 illustrates a schematic block diagram of a portion of a transmitter architecture of an infrastructure equipment which is configured to generate a narrow band wake-up signal for a narrow band communications device (NB-IoT UE)

FIG. 6 illustrates a schematic block diagram of a portion of a transmitter architecture of an infrastructure equipment which is configured to transmit a WUS comprising a preamble formed by a plurality of Orthogonal Frequency Division Multiplexed, OFDM, symbols, each of the OFDM symbols being modulated with a reference sequence, and wherein one or more of the OFDM symbols are transmitted having been shifted in frequency with respect to successive others of the OFDM symbols.

As shown in FIG. 6, which largely corresponds to the description above relating to the construction of each WUS OFDM preamble symbol in terms of the PN Sequence, ZC sequence (which together form the reference sequence) and the frequency shift function, a portion of a transmitter architecture of an infrastructure equipment of the wireless communications network comprises both a PN generator 80 and a ZC generator 82. As described above, the PN generator 80 is initialised by the Cell ID of the cell operated by the infrastructure equipment, and the output of the PN generator 80 is multiplied 84 by (or more specifically, the dot product is taken with) the output of the ZC generator 82. An inverse Fourier transform 86 is then taken of the output of the multiplier 84, and the result of this is then multiplied 89 by the function $e^{-ja_m k}$, which represents a frequency shift with a frequency shift component of $a_m$ for preamble symbol m. The output of the multiplier 89 is the mth WUS preamble symbol.

In some embodiments of the present technique, when the symbol index m is odd, $a_m=0$, so that the frequency shift $e^{-ja_m k}=1$ whilst for zero or even m $a_m=2\pi nS$ where n is an integer and S is the subcarrier spacing (i.e. 15 kHz in efeMTC). Thus for the WUS preamble, the OFDM symbols alternate between symbols with a frequency shift and those without as:

$$w_m(k) = x_m(k)e^{-ja_m k}$$
$$w_{m+1}(k) = x_{m+1}(k)$$
$$w_{m+2}(k) = x_{m+2}(k)e^{-ja_{m+2} k}$$

In other words, each of the OFDM symbols forming the preamble of the wake-up signal are associated with a unique symbol index, and wherein the OFDM symbols which are transmitted having been shifted in frequency with respect to the frequency of the successive other OFDM symbols are those with an even symbol index.

In some examples, the frequency shift components $a_p=a_q$ for p≠q so the frequency shift for all frequency-shifted symbols is the same. In other words, the OFDM symbols which are transmitted having been shifted in frequency with respect to the frequency of the successive other OFDM symbols are each transmitted having been shifted in frequency by a same amount. In alternative arrangements, the OFDM symbols which are transmitted having been shifted in frequency with respect to the frequency of the successive other OFDM symbols are each transmitted having been shifted in frequency by an amount dependent on their symbol index.

Narrow Band IoT WUS

Figure 7:
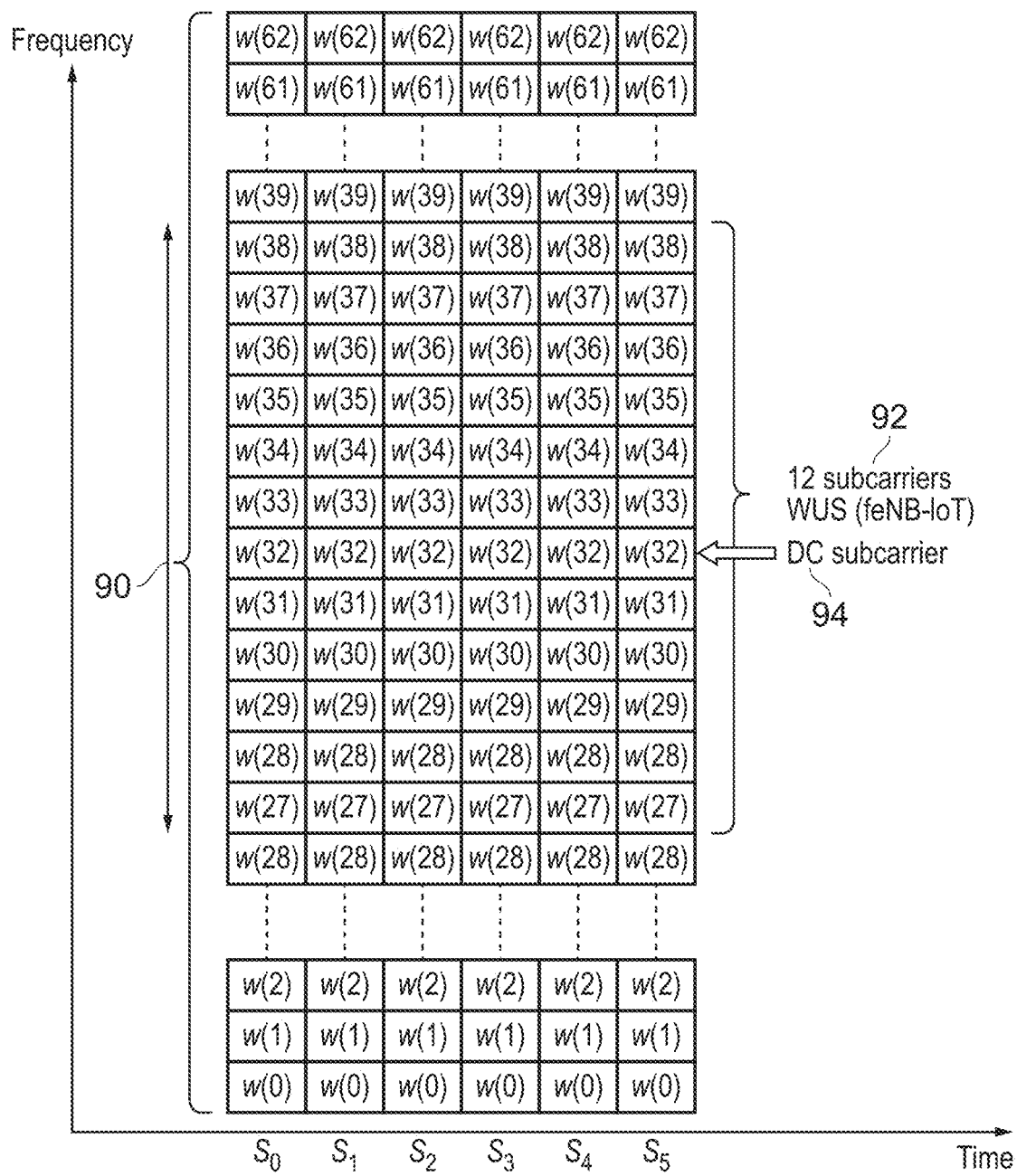
FIG. 7 provides an example representation of a narrow band (NB-IoT) WUS in a narrow band channel.

Example embodiments of the present technique can provide an arrangement in which a wide band WUS is formed from a set of narrowband WUS. The narrowband WUS can be designed to be detected and to be used for waking-up narrow band IoT communications devices, which are configured with a narrowband receiver. The narrowband WUS are combined to form a wider bandwidth WUS for use in waking up communications devices which are configured with a wider bandwidth receiver. In some examples, the narrowband WUS can be configured in accordance with a representation provided in FIG. 7. According to this example a narrow band WUS is shown with a narrowband 90, which comprises 12 subcarriers 92 as shown in FIG. 7, which is therefore a narrow band WUS suitable as a NB-IoT WUS. In this example, the wake-up signal is transmitted in a substantially central portion of a narrow band channel of a wireless access interface of the wireless communications system. The ZC root is selected such that the central eleven subcarriers form another ZC sequence with a length of eleven. In this way, the central twelve subcarriers 92 can be used for feNB-IoT which has a narrow bandwidth (one PRB). The central subcarrier 94 is nulled as it would coincide with the DC subcarrier of the UE. Although in this example the central twelve subcarriers 92 are used for feNB-IoT, it should be noted that other subsets of twelve subcarriers can also be used, but it may in such cases be necessary to null another subcarrier to act as the DC subcarrier for feNB-IoT. It should be appreciated that a larger number of WUS preamble symbols may be required for feNB-IoT because of the narrow bandwidth if the same dynamic range is required for WUS detection as for efeMTC.

In some embodiments of the present technique, the WUS preamble for feNB-IoT can be designed with its own organic ZC of length $N_{SC}=11$ and commensurate PN sequence. In other words, each of the plurality of wake-up signals are transmitted with a unique reference sequence.

Example receivers for detecting a WUS preamble signal and also for recovering signalling information from the part of the WUS signal which is carrying signalling information are disclosed in European patent application number 17186065.3 the contents of which are herein incorporated by reference.

Forming a Wider Band WUS from Narrow Band WUS

As will be appreciated from the above explanation, different WUS can be used in different cells (in order to enable frequency reuse). However, there is a potential problem in that a WUS in one cell may interfere with a WUS transmitted from another cell. This can occur if the WUS sequences in the two cells are similar or correlate with one another. Interference between WUS in different cells can lead to an increased probability of WUS miss-detection or WUS false alarm. A different WUS can be used to wake up different groups of UEs (that occupy the same paging occasion) within a cell. This can allow for further UE power consumption reduction (since it is possible to only wake up the subgroup of those UEs that could potentially be paged within a paging occasion with a group-specific WUS).

There are proposals for an NB-IoT WUS. This WUS occupies a single PRB (twelve tones) and consists of a long Zadoff-Chu sequence, although it will be appreciated that there are alternative ways of constructing an NB-IoT WUS as described above. The NB-IoT WUS can be repeated in time in order to operate at lower signal to noise ratios.

There have been proposals to reuse the NB-IoT WUS [16], [17], [18], [19] for efeMTC. This would have the merit of providing commonality between the hardware design of eMTC and NB-IoT, but would impact on the performance of eMTC (since the NB-IoT WUS occupies a single PRB, the transmit power of the NB-IoT WUS is lower and has to be transmitted for a longer time in order to be received at the same SNR as the eMTC WUS).

In [19], it is proposed to construct an eMTC WUS by performing frequency repetition of the NB-IoT WUS. While this reduces a total transmission time of the WUS (in contrast to using a 1 PRB WUS for eMTC), this does not help to reduce intercell interference.

Embodiments of the present technique can provide a method of operating an infrastructure equipment which forms part of a wireless communications network, the infrastructure equipment being configured for communicating with one or more communications devices. The method comprises determining that a downlink signal should be transmitted to a communications device, forming the downlink signal for transmission via a wireless access interface, the wireless access interface comprising in a frequency dimension resource elements each of the resource elements being for carrying a sub-carrier of an Orthogonal Frequency Division Multiplexed symbol, the resource elements being formed in the frequency dimension into a plurality of blocks of resource elements, and in a time dimension the wireless access interface is divided into time units, each of the time units for carrying a number of OFDM symbols, and transmitting the downlink signal from the infrastructure equipment to the communications device. The downlink signal may provide signalling information, physical communications parameters or provide a reference from which a receiving communications device can acquire synchronisation with the network. The forming of the downlink signal comprises selecting a plurality of component-signals from a set of component-signals, each of the component-signals from the set of component-signals being formed from a sequence of signal samples for transmission in one of the blocks of resource elements and in one of the time units, each of the component-signals being detectable by a narrow bandwidth receiver, and selecting for each of the plurality of component-signals one or more of the plurality of the blocks of resource elements and one or more of the time units to transmit the component-signal. In one example the component signal, which is an NB-IoT signal is formed as explained above with reference to FIG. 7 from twelve sub-carriers and 11-14 OFDM symbols and the time-unit is one sub-frame. The transmitting the signal from the infrastructure equipment to the communications device comprises transmitting the plurality of selected component signals in the selected blocks of resource elements. The sequence of signal samples for transmission in one of the blocks of resource elements and in one of the time units may for example be a narrow band Internet of Things Wake-up Signal (NB-IoT WUS) formed for example as explained above from a Zadoff-Chu sequence carried by the number of OFDM symbols within a sub-frame of wireless access interface, the plurality of component-signals forming an eMTC-WUS.

Embodiments of the present technique can provide wireless communications systems in which an eMTC WUS is composed of a plurality of constituent NB-IoT WUS sequences (component-signals), where the arrangement of the NB-IoT WUS sequences can provide either improved robustness to intercell interference between cells or an improved operation efficiency at different coupling losses (different path losses caused by different radio communication conditions) or better grouping of UEs.

Note that also although the following embodiments are described with respect to generating a WUS, embodiments of the present technique can also be used to generate a synchronisation sequence, such as a "Re-synchronisation signal" (RSS) or an "MTC synchronisation signal" (MSS): i.e. an eMTC synchronisation signal can be constructed from NB-IoT synchronisation signals.

The following is a set of example embodiments detailing how the eMTC WUS can be constructed from a plurality of NB-IoT WUS.

Intercell Interference Mitigation: Constructing Different WUS in Different Cells According to example embodiments of the present technique, the eMTC WUS is constructed from frequency repetitions of NB-IoT WUS sequences in the frequency domain. Further inter-cell interference of WUS signals can be reduced by arranging the signal components for an eMTC WUS in one cell to be different from an eMTC WUS used in another cell. An example of such an arrangement is illustrated in FIGS. 8 and 9.

Figure 8:
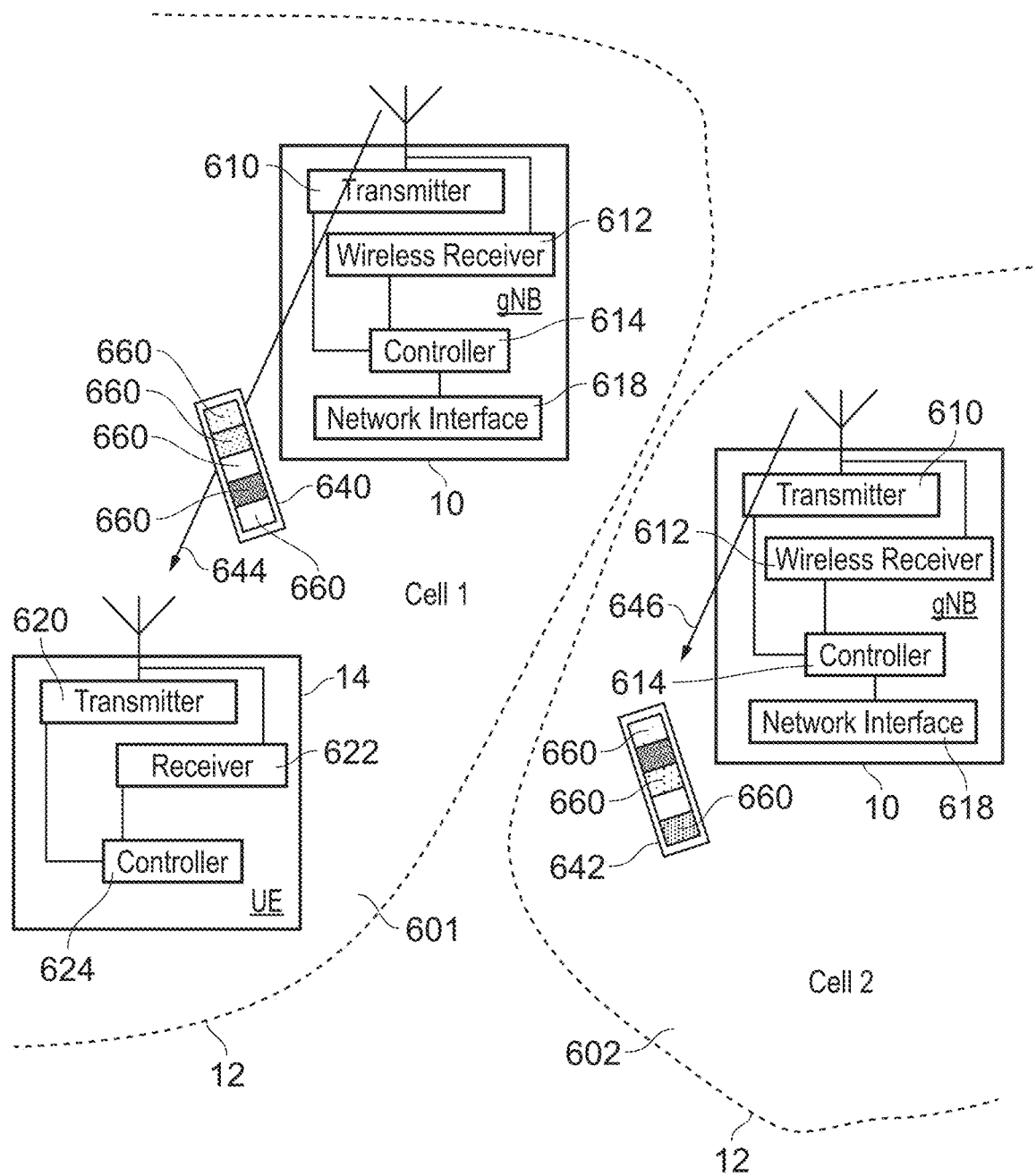
FIG. 8 is a schematic block diagram showing two infrastructure equipment (base stations, eNB, gNB or TRP) forming part of the wireless communications system shown in FIG. 1 or FIG. 2 transmitting a wider bandwidth (eMTC) WUS to communications device (UE) according to an example embodiment of the present technique.
Figure 9:
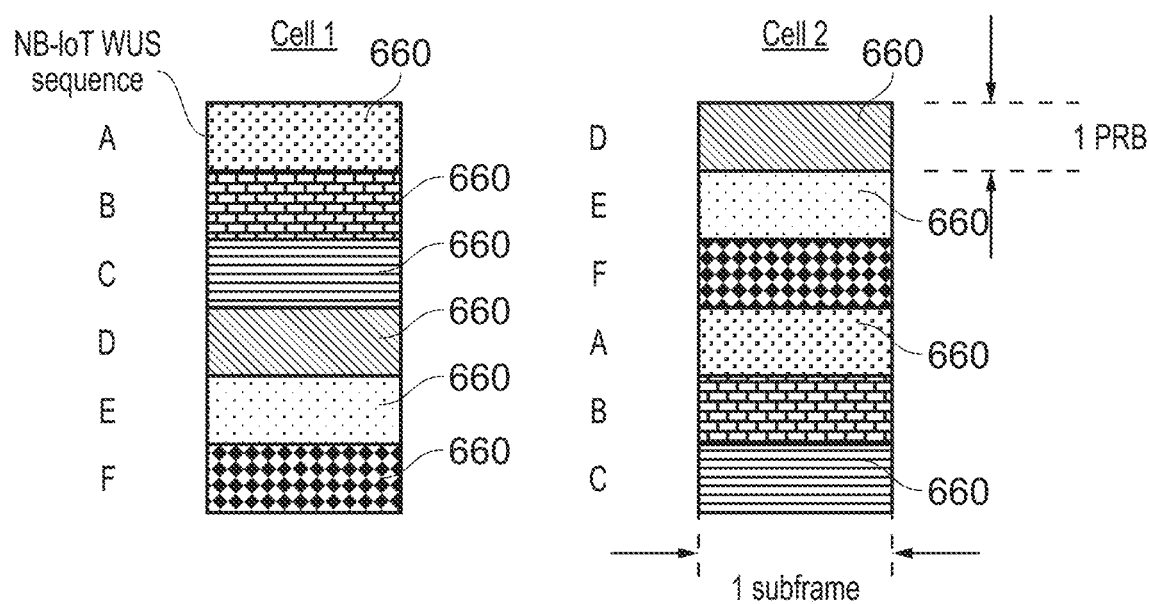
FIG. 9 is a schematic representation of two wider bandwidth (eMTC) WUS formed from narrow bandwidth (NB-IoT) WUS transmitted in different cells of the example illustrated in FIG. 8 in which the order of the narrow bandwidth WUS is different for each cell.

FIG. 8 provides a schematic block diagram showing in more detail some of the components of the wireless communications system illustrated in FIGS. 1 and 2. As shown in FIG. 8 two of the base stations, gNBs or TRPs 10 form two cells, cell 1 601 and cell 2 602 of a wireless communications network. Each of the cells (cell 1 601, cell 2 602) is formed within a range for transmitting and receiving radio signals from the respective TRPs 10 within a propagation range of the radio signals which therefore forms a cell boundary illustrated by representative lines 12 forming cells 601, 602. The TRPs 10 shown in FIG. 8 therefore form two cells (cell1, cell2) of a wireless communications network. The TRPs 10 each include a transmitter 610, a receiver 612 and a controller 614. The transmitter 610 includes signal processors and radio frequency circuitry for transmitting radio signals (including those of FIG. 7 forming a wireless access interface under the control of the controller 614. The controller may form or be part of a scheduler which allocates resources of the wireless access interface formed by the TRP 10 and controls transmissions by the transmitter 610 to transmit signalling and user data to communications devices (UEs) 214 within the cells cell1 601, cell2 602, formed by the TRP 10. The receiver 612 includes components such as radio frequency filters and amplifiers as well as signal processors, for example to detect radio signals transmitted by communications devices (UEs) 14 within a propagation range of the radio signals formed by the cell (cell1, cell2). Each of the TRPs 10 also includes a network interface 618 for forming a network interface connection with other components of the wireless communications network such as the core network or the distributed unit (DU) shown in FIG. 2.

An example illustration of a UE 14 is shown which operates with the wireless communications network to transmit data to or receive data from the network. The UE 14 includes a transmitter 620, a receiver 622 and a controller 624. The transmitter may comprise signal processing devices and radio frequency modulators and amplifiers for transmitting data bearing radio signals to the TRP 10 via the wireless access interface provided by the TRP 10 in order to transmit signalling and user data. The receiver comprises signal processors and radio frequency filters and amplifiers for detecting radio signals transmitted from the TRP 10 via the wireless access interface to receive signalling messages and user data on the down link from the TRP 10. The transmitter 620 and the receiver 622 are controlled by the controller 624 which may include processors configured by software or hardware.

As shown in FIG. 8 and consistent with the example of transmitting a wideband WUS signal, the UE 14 is configured to operate as an eMTC device, which can be configured to receive radio signals transmitted across a wider bandwidth than that which can be received by a narrowband IoT device. As will be explained in the following example embodiments, each of the TRPs 10 in the different cells (cell1 601, cell2 602) is configured to transmit a different wider bandwidth WUS 640, 642 to respective UEs within the cells 601, 602, as represented by the arrows 644, 646 for each of the corresponding cells (cell1 601, cell2 602), which can be detected by the respective UEs 14. However the WUS is designed so that as far as possible co-channel interference of a WUS transmitted in a neighbouring cell can be reduced. Each of the eMTC WUS signals 640, 642 comprises a different combination of NB-IoT WUS, each of which occupies a single PRB, each of the blocks 660 of the WUS 640, 642 representing a different NB-IoT WUS. The design of the WUS is illustrated in FIG. 9.

FIG. 9 provides a schematic diagram illustrating an arrangement in which an order of NB-IoT WUS sequences in the frequency domain can be used to create an eMTC WUS sequence as a function of cell ID. This arrangement can be achieved by one of the following two techniques:

The eMTC WUS in cell 1 (e.g. cell1 601) is constructed from a different set of NB-IoT WUS sequences from the eMTC WUS in cell 2 (e.g. cell2 602). Here each of the NB-IoT WUS sequences in the set may be for example formed from a different Zadoff-Chu or PN sequence or by cyclically shifting the same sequence.

A set of NB-IoT WUS sequences is used to construct the eMTC WUS in both cell 1 and cell 2. The order of the concatenation of the NB-IoT WUS sequences used in cell 1 is different to the order used in cell 2. This is illustrated in FIG. 9, where in cell 1, the eMTC WUS sequence is created from a set of NB-IoT WUS sequences in the order {A, B, C, D, E, F}, whereas in cell 2, the same NB-IoT WUS sequences are used, but are cyclically shifted to create the order {D, E, F, A, B, C}.

Whereas FIG. 9 shows a cyclic shifting of sequences to distinguish cell 1 from cell 2, it will be understood that other permutations can be applied (e.g. cell 2 could use NB-IoT sequences in a reverse order {F, E, D, C, B, A}, could have pairs of NB-IoT WUS sequences permuted to create {B, A, D, C, F, E}, could use a quasi-random re-ordering etc).

Note that the sets can either be partially overlapping or fully overlapping.

Inter-Cell Interference Mitigation: Changing WUS Sequences in Time in Different Cells According to another example embodiment an eMTC WUS can be constructed from NB-IoT WUS sequences where the construction of the WUS sequence in one subframe uses a different arrangement of constituent NB-IoT WUS sequences than another subframe. A set of constituent NB-IoT WUS sequences used in a subframe can be a function of the cell ID, where the same set of NB-IoT WUS sequences can be used in a different cell, but those NB-IoT sequences are used in a different subframe. This ensures that a constituent NB-IoT WUS sequence in one cell does not interfere with the same sequence in another cell. An arrangement of using different NB-IoT WUS sequences in one sub-frame to those in another subframe is illustrated in FIG. 10.

Figure 10:
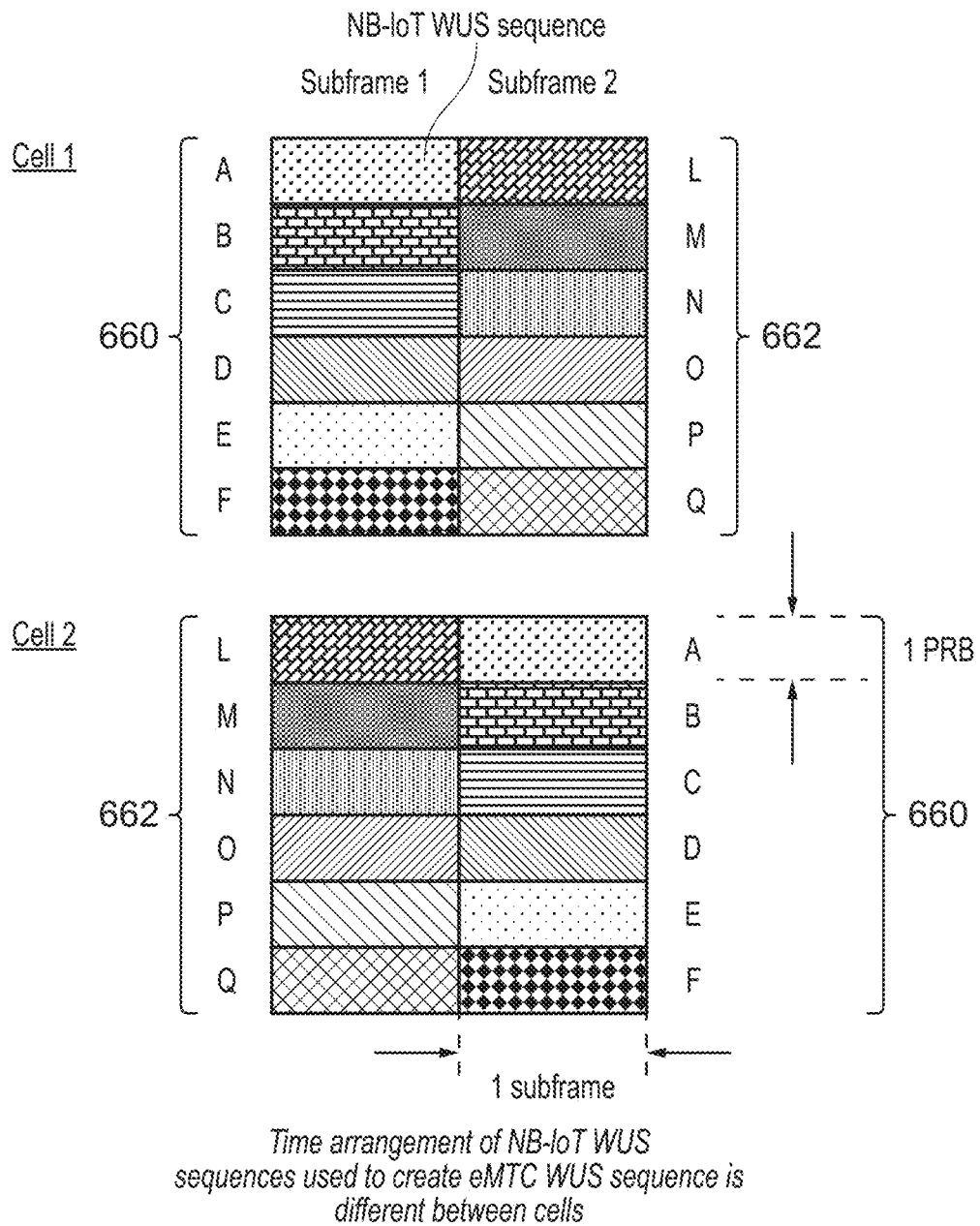
FIG. 10 is a schematic representation of a further example of two wider bandwidth (eMTC) WUS formed from narrow bandwidth (NB-IoT) WUS for transmission in different cells in which the narrow band WUS component signals are arranged to be different and contemporaneously transmitted in the same blocks of resource elements and time units.

In FIG. 10, cell 1 uses NB-IoT WUS sequences 660 {A, B, C, D, E, F} in subframe 1 and uses NB-IoT WUS sequences 662 {L, M, N, O, P, Q} in subframe 2. The same set of sequences is used in cell 2, but in cell 2 the set of constituent NB-IoT WUS sequences 660 {A, B, C, D, E, F} is used in subframe 2, whereas the second set of NB-IoT sequences 662 {L, M, N, O, P, Q} is used in subframe 1. Hence the first sequence 660 in cell 1 does not interfere with the first sequence 660 used in cell 2 since this sequence is not active in both cells at the same time. Furthermore, the first sequence 660 in cell 1 does not interfere with the second sequence 662 used in cell 2 in the first subframe provided correlation between the first sequence 660 and the second sequence is sufficiently low.

The UE can differentiate between the WUS in cell1 and the WUS in cell2 based on the ordering of the constituent sequences in the subframes. For example, a UE in cell2 will search for the sequence {L,M,N,O,P,Q} in a first subframe followed by the sequence {A,B,C,D,E,F} in the following subframe. The UE in cell2 will not consider the WUS in cell1 to be a valid WUS in cell2, since the sequence {L,M,N,O,P,Q} is not followed by the sequence {A,B,C,D, E,F} (on the contrary, sequence {L,M,N,O,P,Q} is preceded by the sequence {A,B,C,D,E,F}).

This provides an extra level of inter-cell interference mitigation. This is because, if the eMTC WUS sequence in one subframe has poor correlation properties with an eMTC WUS sequence in another cell, then it is less likely that there are poor correlation properties for the eMTC WUS sequence in a subsequent subframe.

In another embodiment, the NB-IoT WUS sequence construction e.g. {A, B, C, D, E, F} is a function of the cell ID. Hence this can ensure a different sequence construction for different Cell ID uses.

Intercell Interference Mitigation Through Intra-Narrowband Frequency Hopping

Figure 11:
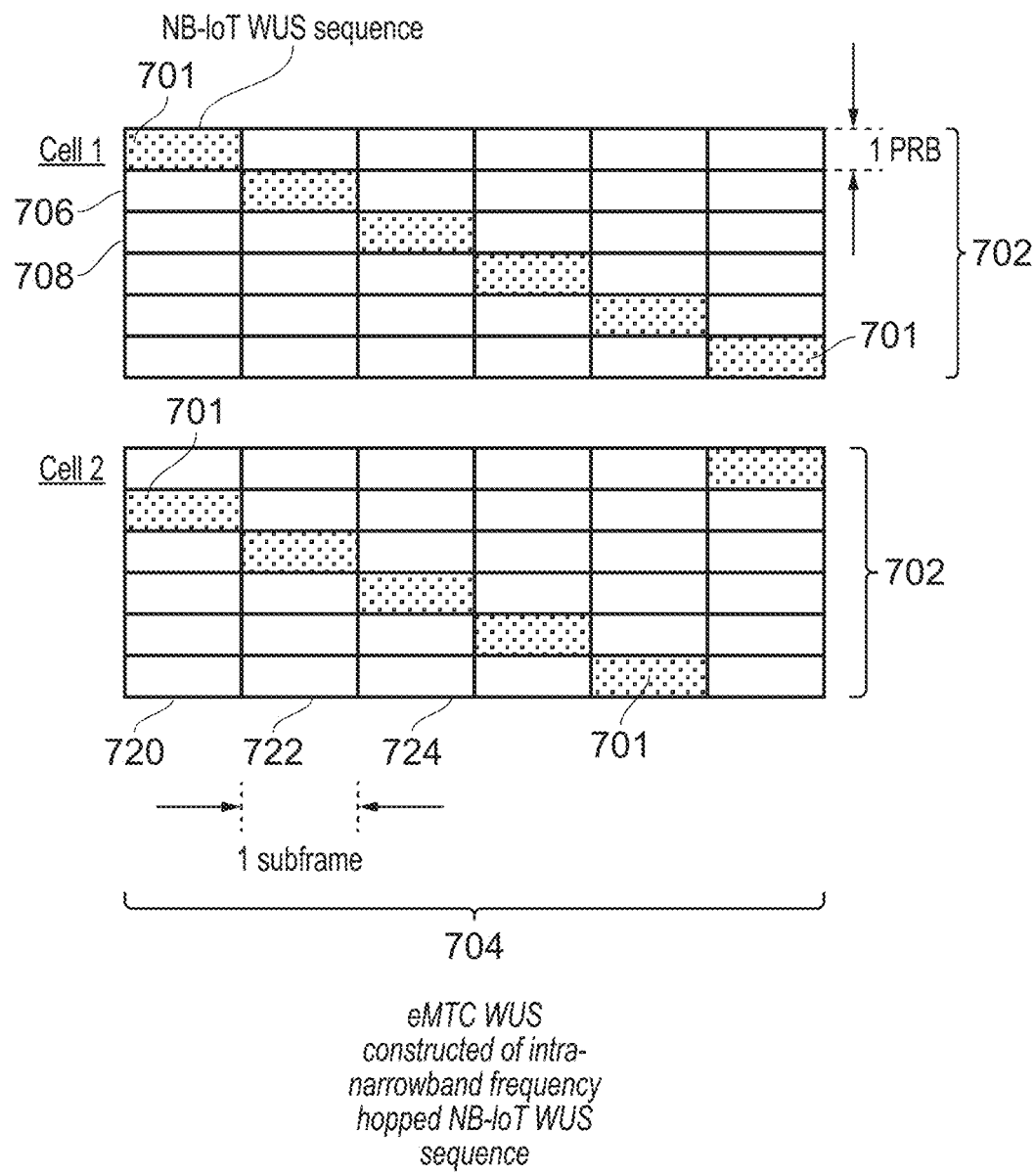
FIG. 11 is a schematic representation of a further example of two wider bandwidth (eMTC) WUS formed from narrow bandwidth (NB-IoT) WUS for transmission in different cells in which different blocks of resource elements are selected to avoid co-channel interference.

At a low coupling loss, which is a term used to describe a path-loss or signal strength loss with distance between the base station and UE, it can be acceptable to transmit the eMTC WUS with a lower transmit power, or with fewer PRBs than a maximum number available, which for example is six PRBs. Hence the eMTC WUS can be constructed from a single NB-IoT WUS sequence but the single NB-IoT WUS sequence can be transmitted at different times or frequencies in order to avoid interfering with a corresponding transmission in an adjacent cell. Such an example is shown in FIG. 11. FIG. 11 provides an example embodiment in which the single NB-IoT WUS sequence is frequency hopped, the hoping pattern being different for different cells.

As shown in FIG. 11, the physical resource block, PRB 701, used in the eMTC narrowband is frequency hopped, where the frequency hopping sequence depends on the cell ID. When different frequency hopping sequences are applied in different cells, intercell interference between the WUS sequences in those different cells can be mitigated or at least reduced. This example embodiment is illustrated in FIG. 11. The frequency hopping of the constituent NB-IoT WUS, occupying a single PRB, is shown in FIG. 11 as occurring within the eMTC narrowband, where the eMTC narrowband itself is not frequency hopped. In other embodiments, the eMTC narrowband itself may also be frequency hopped.

In FIG. 11, in a first cell referred to as cell 1, a certain set of PRBs, shown as shaded boxes 701 is used for transmission of the NB-IoT WUS sequence, with a set of six PRBs 702 provided in a frequency dimension and a plurality of six subframes 704. Frequency hopping is applied in this cell 1. For this example, a simple linear increase of the PRB frequency location is provided with respect to time. In a second cell, cell 2, the same NB-IoT WUS sequence is used as in cell 1, but the PRBs used for transmission of that NB-IoT WUS sequence are frequency hopped in a different pattern. As such, the PRBs used in cell 2 are offset in the frequency domain by 1 PRB relative to cell 1. Hence a different frequency hopping pattern is used in cell 1 and cell 2.

Although the example in FIG. 11 shows that a single sequence is used in the frequency hopping, sequence hopping can also be employed in combination with frequency hopping. For example in the first subframe 720, a Sequence A could be used, in the 1$^{st}$ PRB 701, in the second subframe 722 a Sequence B could be used in the second PRB 706 and in the third subframe 724 a Sequence C is used in the third PRB 708 etc.

In another example embodiment the frequency hopping pattern can be a function of the cell ID.

Some advantages of having different constructions of eMTC WUS sequences in one cell to the sequences in the other cell are that:

intercell interference is mitigated.

In the prior art, frequency repetition would lead to eMTC WUS sequences constructed as {A,A,A,A,A, A} in cell 1 and {B,B,B,B,B,B} in cell 2. If A has poor correlation properties with respect to B, the eMTC WUS sequences in cell 1 and cell 2 interfere with one another.

In an embodiment of the present technique (as described above), if the sequences in cell 1 and cell 2 are {A, B, C, D, E, F} and {D, E, F, A, B, C} respectively, although sequence A might have poor correlation properties wrt sequence D, it is unlikely that all the other NB-IoT sequences have poor correlation properties with one another. Hence the example embodiment provides sequence diversity when frequency repetition is applied.

Time and Frequency Resource Usage as a Function of Coupling Loss

It has been proposed that WUS may have a maximum time duration and the actual time duration of the WUS can be determined by the base station or at least an infrastructure equipment of the core network. This causes problems since the UE needs to attempt to decode WUS based on multiple hypotheses (blind decoding candidates). This causes an increase in the false alarm rate, leads to ambiguity in the time location of the detected WUS and increases UE complexity.

In an example embodiment of the present technique, the eMTC WUS is composed of constituent NB-IoT WUS sequences. The length of the eMTC WUS sequence is constant, that is to say that there is no "maximum" time duration of the eMTC WUS; there is only a fixed time duration of the WUS. However the amount of resource applied to the WUS varies through using fewer NB-IoT constituent WUS sequences at lower coupling losses and more NB-IoT constituent WUS sequences at higher coupling losses. Such an example arrangement is represented by a schematic block diagram shown in FIG. 12, which has corresponding parts to that of FIG. 8, with a more detailed representation of different eMTC WUS for a high and a low coupling loss shown in FIG. 13.

Figure 12:
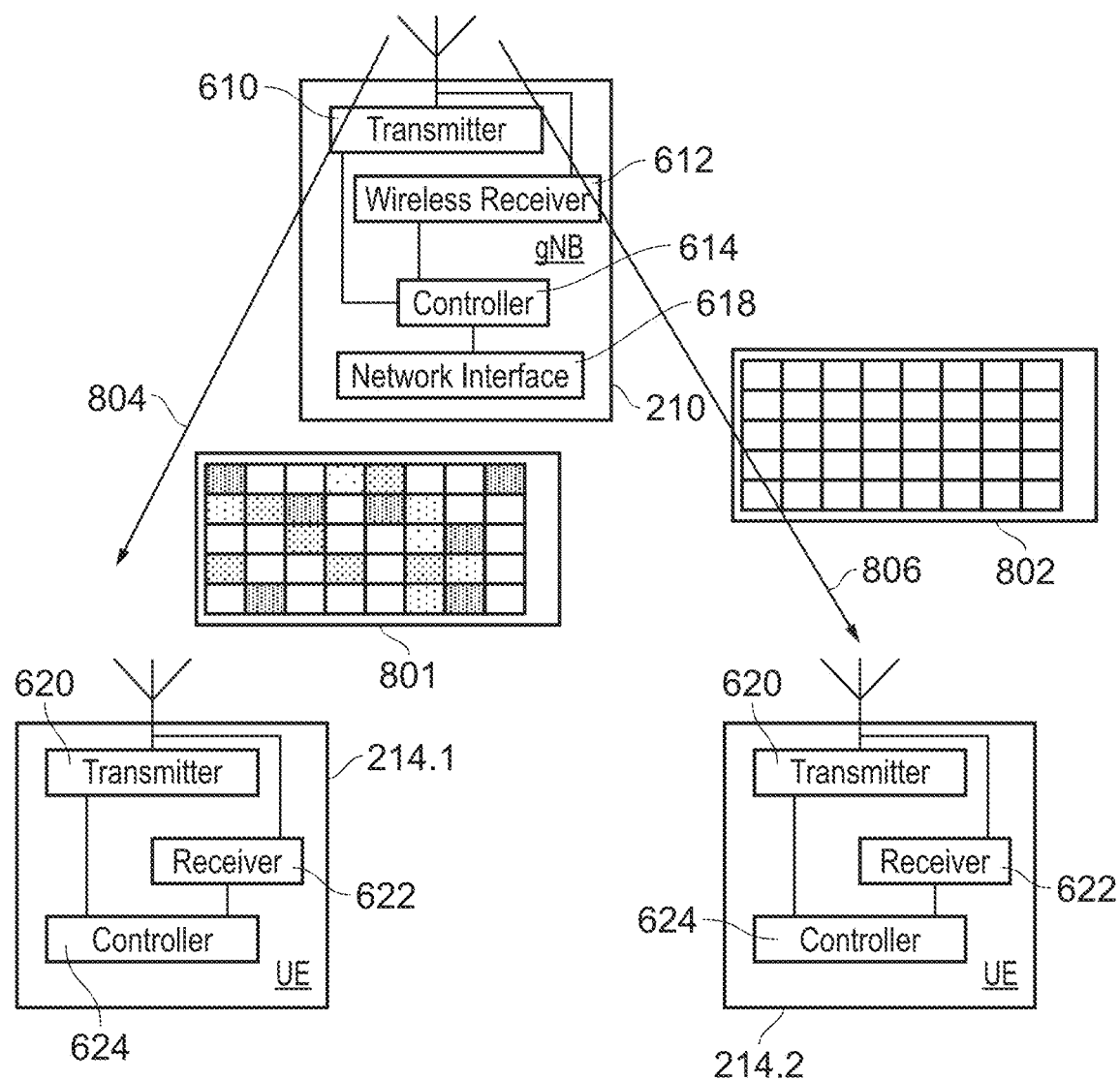
FIG. 12 is a schematic block diagram showing an infrastructure equipment (base station, eNB, gNB or TRP) forming part of the wireless communications system shown in FIG. 1 or FIG. 2 transmitting two wider bandwidth (eMTC) signals each for a different communications device (UEs) forming part of different groups of communications devices (UEs) communicating in the same cell according to an example embodiment of the present technique.

As shown by the example embodiment in FIG. 12 a single base station or TRP 210 is shown to transmit different WUS 801, 802 to different UEs 214.1, 214.2 within the same cell as represented by arrows 804, 806. The TRP 210 and the UEs 214.1, 214.2 have the same components as those shown in FIG. 8 and so will not be explained again. For the example shown in FIG. 12, each of the two UEs 214.1, 214.2 is located at a different distance from the TRP 210 and so will suffer a different path loss and radio propagation conditions. For the example shown in FIG. 12 and explained with reference to FIG. 13, a coupling loss caused by poorer radio communication conditions to the first UE 214.1 is higher than the coupling loss caused by better radio communications conditions to the second UE 214.2, which experiences a lower coupling loss.

Figure 13:
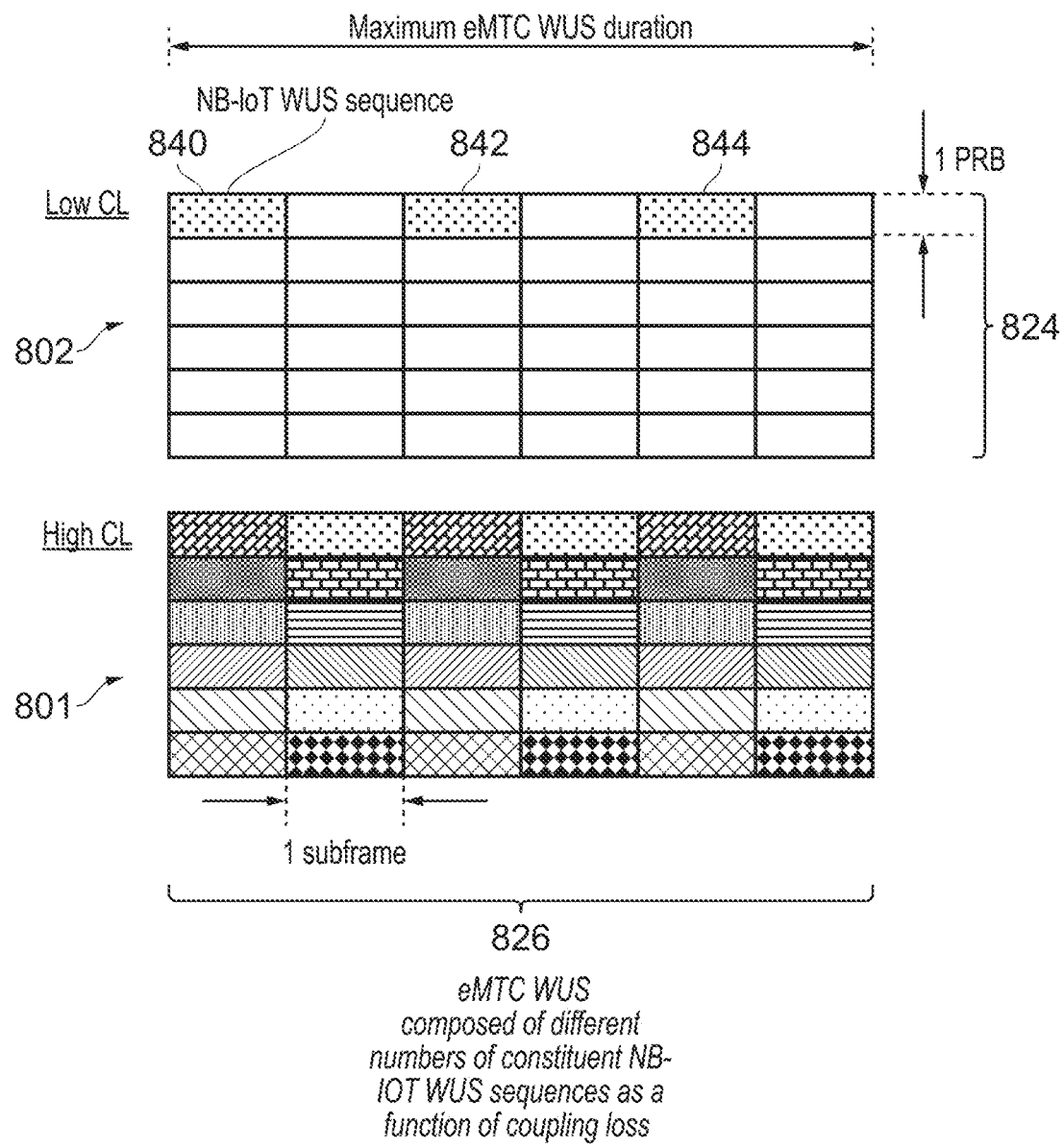
FIG. 13 is a schematic representation of two wider bandwidth (eMTC) signals formed from narrow bandwidth (NB-IoT) signals for transmission to a communications device where there is a different coupling loss (path loss) between the infrastructure equipment and the communications device.

FIG. 13 provides a representation of communications resources in time and frequency, with PRBs 824 in a frequency dimension and sub-frames 826 in a time dimension. According to the example embodiment shown in FIG. 13, an eMTC WUS that is used at a low coupling loss or path loss ("low CL") 802 comprises only three constituent WUS signals 840, 842, 844 shown in shaded PRBs, where each single constituent WUS signal corresponds to an NB-IoT WUS sequence every two subframes 826 and for one in every six PRBs 824. As such an infrastructure equipment (TRP or eNB) is configured to adapt the eMTC WUS signal in accordance with radio communications conditions so that for a low coupling loss 802, only three NB-IoT WUS sequence are transmitted 840, 842, 844. In contrast as shown in FIG. 13, for a high coupling loss ("high MCL") 801 the eMTC WUS comprises more constituent NB-IoT WUS sequences in both the time and frequency domains. As shown in FIG. 13 for a high coupling loss example 801, in each of the PRBs 824 in each of the sub-frames 826 a NB-IoT WUS sequence is transmitted. This denser WUS 801 will be able to operate at higher coupling losses, because more energy is transmitted within this WUS.

For the example embodiment shown in FIG. 13, the eMTC WUS used at low coupling loss 802 and the eMTC WUS used at high coupling loss 801 both have the same fixed time duration. As a result, a number of WUS hypotheses that the UE has to decode can be reduced, because the UE is aware that it only needs to search for signals in this time and frequency space defined by the PRBs 824 and the sub-frames 826. As such, a timing of the eMTC WUS is more clearly defined because there is one start time and one end time of the eMTC WUS regardless of the coupling loss.

Creating Sub-Groups of UEs

In order to reduce UE power consumption, it is desirable to be able to only wake up a sub-group of UEs that share the same paging occasion. For example, consider the case where UEs 1 and 2 belong to sub-group 'X' and UEs 3 and 4 belong to sub-group 'Y', and all of those UEs occupy the same paging occasion. If UE1 is to be paged, UE power could be saved if a WUS applied to only sub-group 'X' UEs: in this case UEs in sub-group 'Y' would not detect the sub-group 'Y' WUS and would sleep during the following paging occasion. According to an example embodiment an eMTC WUS can be constructed by an eNB or TRP to be transmitted to a specific subgroup be creating the eMTC WUS from constituent NB-IoT WUS sequences.

Figure 14:
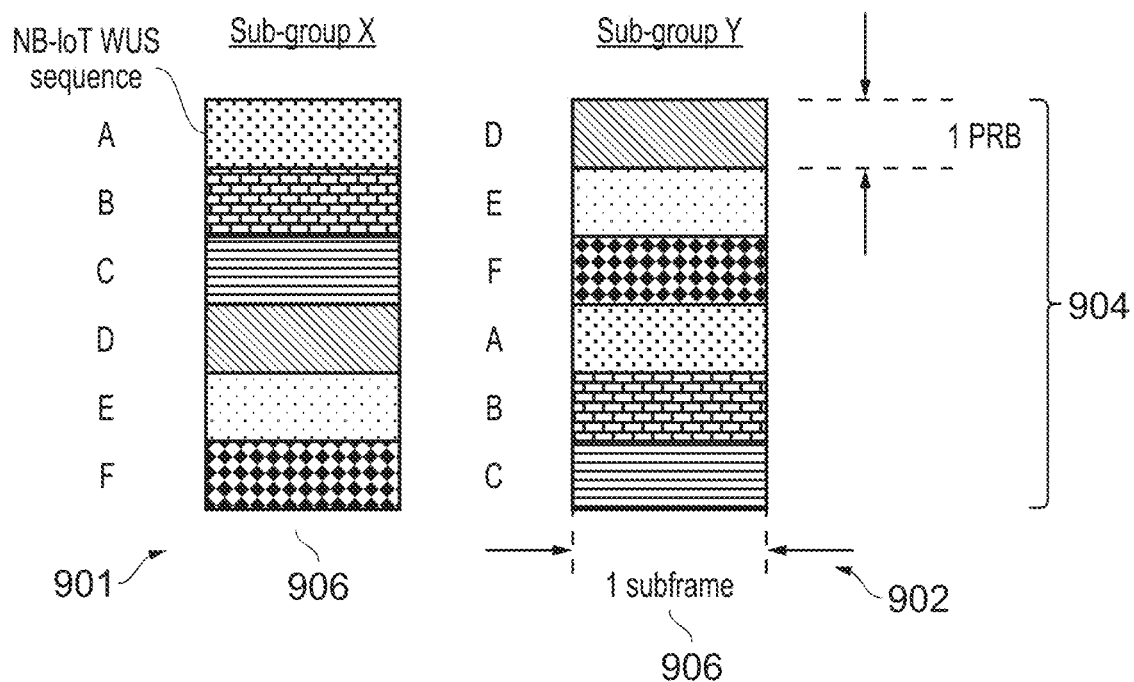
FIG. 14 is a schematic representation of two wider bandwidth (eMTC) signals formed from narrow bandwidth (NB-IoT) signals for transmission to different communications device (UEs) forming part of different groups of communications devices (UEs) communicating in the same cell according to an example embodiment of the present technique.

UEs in a WUS sub-group use an eMTC WUS that is comprised of an arrangement of constituent NB-IoT WUS sequences that is specific to that WUS sub-group. An example embodiment of the present technique is shown in FIG. 14 which illustrates this aspect. As shown in FIG. 14, two eMTC WUS 901, 902 are formed for different sub-groups of UEs, which are comprised of different cyclic shifts of a WUS sequence {A, B, C, D, E, F} transmitted in six PRBs 904 of a sub-frame 906. The UEs in sub-group 'X' use an eMTC WUS with sequence {A,B,C,D,E,F} whereas the UEs in sub-group 'Y' use an eMTC WUS with sequence {D, E, F, A, B, C}. Although the example embodiment shown in FIG. 14 does not show that the WUS for sub-group 'X' and sub-group 'Y' are separated in time, because they are transmitted in the same sub-frame 906, it will be appreciated that in other embodiments the WUS for sub-group 'X' and sub-group 'Y' could be separated in time. As such, FIG. 14 corresponds to the example embodiment shown in FIGS. 18 and 19 except that the example WUS signals in FIGS. 18 and 19 are transmitted in different cells, whereas in FIG. 14 the example WUS signals are transmitted in the same cell to different sub-groups.

For the example embodiment shown in FIG. 14, an eNB or TRP (infrastructure equipment), which is configured to transmit WUS signals according to this example, can only signal (page or wakeup) UEs in sub-group 'X' or in sub-group 'Y' at the same time, so that both UEs in sub-group 'X' and sub-group 'Y' cannot be paged at the same time.

Figure 15:
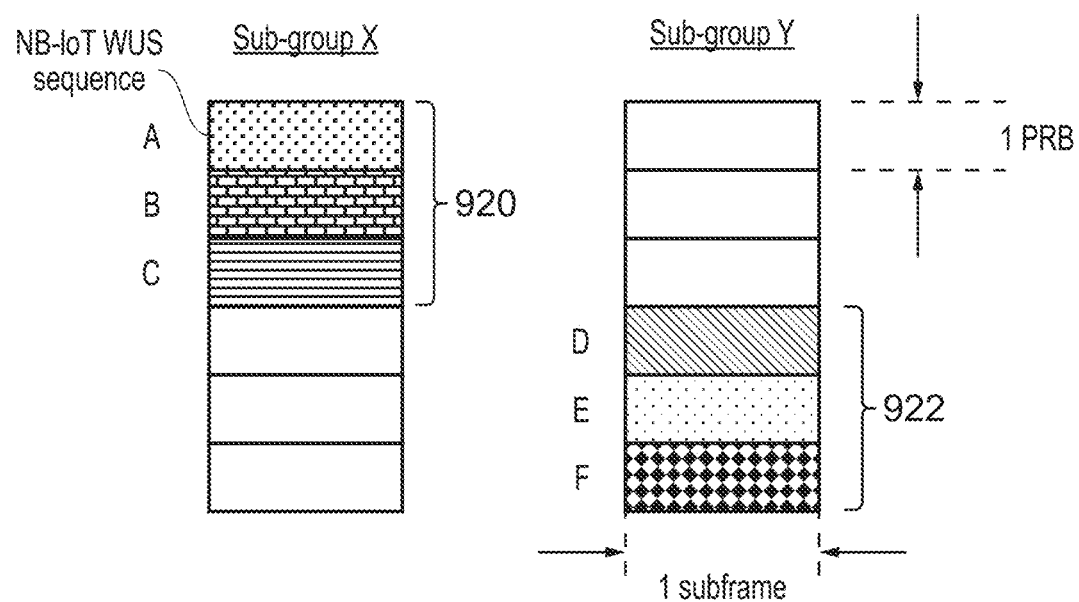
FIG. 15 is a further example of two wider bandwidth (eMTC) signals formed from narrow bandwidth (NB-IoT) signals for transmission to different communications device (UEs) forming part of different groups of communications devices (UEs) according to an example embodiment of the present technique.

As will be appreciated, more than one sub-group can be paged at the same time by constructing the eMTC WUS sequences using constituent NB-IoT WUS sequences that occupy different PRB resources. An example embodiment providing such an example is shown in FIG. 15. In FIG. 15 sub-group 'Y' uses different NB-IoT WUS sequences ({D, E,F}) occupying different PRBs 922 to the NB-IoT WUS sequences used for sub-group 'X' ({A,B,C}) occupying PRBs 920. There are other arrangements that provide the same technical advantage:

both sub-groups use NB-IoT WUS sequences {A,B,C}, but the sequences for sub-group 'X' uses different PRBs to the sequences for sub-group 'Y' the constituent NB-IoT WUS sequences for sub-group 'X' are not contiguous in the PRB domain (and similarly for sub-group 'Y'). E.g. the eMTC WUS for sub-group 'X' uses NB-IoT sequences {A,B,C} in PRBs {0,2,4} respectively and the eMTC WUS for sub-group 'Y' uses NB-IoT sequences {D,E,F} in PRBs {1,3,5}.

Summary of Operation

Figure 16:
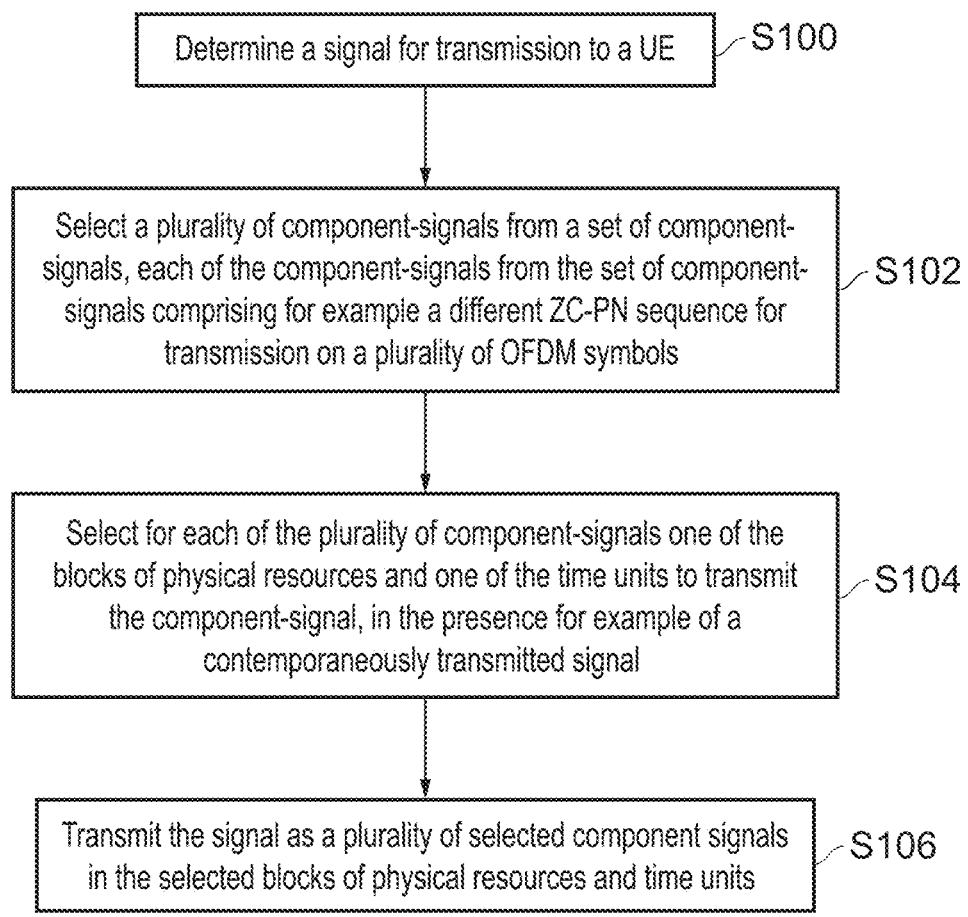
FIG. 16 is an example flow diagram illustrating the operation of an infrastructure equipment in forming a wider band signal from a plurality of component narrow bandwidth signals.

FIG. 16 provides an illustrative flow diagram of a process of generating a signal for transmission from a base station or infrastructure equipment to a communications device (UE) according to the present technique. FIG. 16 is summarised as follows:

S100: The infrastructure equipment determines the signal for transmission to a UE, which may be a signal for communicating signalling information or physical communications parameters.

S102: A second step S102 comprises selecting a plurality of component-signals from a set of component-signals, each of the component-signals from the set of component-signals being formed from a sequence of signal samples for transmission in one of the blocks of resource elements and one of the time units (sub-frames) by a number of OFDM symbols, each of the component-signals being detectable by a narrow bandwidth receiver. The component signals are selected in accordance with the type of signal to be transmitted, whether this is to avoid co-channel interference in the same cell or from a different cell or whether the signal is to be transmitted with a high coupling loss or a low coupling loss. The selection of the component signals may therefore depend on the blocks of resource elements in which the signal is to be transmitted and whether these are also occupied by another contemporaneously transmitted signal in the same cell or a different cell. More specifically, a wider bandwidth eMTC WUS is formed from a combination of NB-IoT WUS in accordance with the type of signal to be transmitted to avoid co-channel interference etc.

S104: A third step S104 comprises selecting for each of the plurality of component-signals one of the blocks of resource elements and one of the time units to transmit the component-signal. The selection may be made in accordance with a frequency hopping pattern or in accordance with a contemporaneously transmitted signal in the same cell or a different cell. In one example the component-signals are selected from the same set of component-signals from which a contemporaneously transmitted signal is selected in which case the selected component-signals are arranged to be different in each of the blocks of resource elements.

S106: As a fourth step S106 the plurality of selected component-signals is transmitted in the selected blocks of resource elements as a wider bandwidth signal.

Those skilled in the art would appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A method of operating an infrastructure equipment forming part of a wireless communications network for communicating with one or more communications devices, the method comprising
  determining that a downlink signal should be transmitted to a communications device to provide information for the communications device,
  forming the downlink signal for transmission via a wireless access interface, the wireless access interface comprising in a frequency dimension resource elements, each of the resource elements for carrying a sub-carrier of an Orthogonal Frequency Division Multiplexed, OFDM, symbol, the resource elements being formed in the frequency dimension into blocks of resource elements, and in a time dimension the wireless access interface is divided into time units, each of the time units for carrying a number of OFDM symbols, and
  transmitting the downlink signal from the infrastructure equipment to the communications device, wherein the forming of the downlink signal comprises
  selecting a plurality of component-signals from a set of component-signals, each of the component-signals from the set of component-signals being formed from a sequence of signal samples for transmission in one of the blocks of resource elements and in one of the time units by the number of OFDM symbols, each of the component-signals being detectable by a narrow bandwidth receiver, and
  selecting for each of the plurality of component-signals one of the blocks of resource elements and one of the time units to transmit the component-signal, and the transmitting the downlink signal from the infrastructure equipment to the communications device comprises
  transmitting the plurality of selected component signals in the selected blocks of resource elements as a wider bandwidth signal.

Paragraph 2. A method according to paragraph 1, wherein one or both of the plurality of component-signals selected from the set of component-signals and a corresponding plurality of the blocks of resource elements and the one or more of the time units to transmit the plurality of component-signals are selected to reduce co-channel interference from at least one other signal formed from a plurality of component-signals from the set of component-signals transmitted in the blocks of resource elements of the wireless access interface.

Paragraph 3. A method according to paragraph 2, wherein the transmitting the downlink signal from the infrastructure equipment to the communications device, comprises transmitting the downlink signal to the communications device operating within a first cell of the wireless communications network formed by the infrastructure equipment which first cell is different to a second cell formed by a second infrastructure equipment from which the at least one other signal is transmitted.

Paragraph 4. A method according to paragraph 2, wherein the transmitting the downlink signal from the infrastructure equipment to the communications device, comprises transmitting the downlink signal to the communications device operating within a cell of the wireless communications network formed by the infrastructure equipment and from which the at least one other signal is transmitted, and the communications device to which the downlink signal is transmitted forms part of a first group of communications devices and the other signal being transmitted to one or more communications devices forming another group of communications devices.

Paragraph 5. A method according to paragraph 2, 3 or 4, wherein the selecting for each of the plurality of component-signals the blocks of resource elements and one of the time units to transmit the component-signal, comprises selecting one of the blocks of resource elements and one of the time units in which one of the plurality of component-signals of the at least one other signal is not transmitted, the selecting of the blocks of resource elements being mutually exclusive from the blocks of resource elements of the wireless access interface in which the plurality of component-signals of the at least one other signal is transmitted.

Paragraph 6. A method according to paragraph 2, 3 or 4, wherein the selecting for each of the plurality of component-signals the block of resource elements and the one or more of the time units to transmit the component-signal, comprises selecting one of the blocks of resource elements and one of the time units which is the same as one of the blocks of resource elements in which one of the plurality of component-signals of the at least one other signal is transmitted, and the selecting the plurality of component-signals from the set of component-signals comprises selecting the component-signals to be a different one of the component-signals which is transmitted in the same blocks of resource elements and the same time unit to the component-signal of the at least one other signal.

Paragraph 7. A method according to paragraph 5, wherein the selecting the plurality of component-signals from the set of component-signals comprises selecting the component-signals to be a different one of the component-signals which is transmitted in the same blocks of resource elements and the same time unit to the component-signal of the at least one other signal.

Paragraph 8. A method according to any of paragraphs 1 to 3, wherein the selecting the plurality of component-signals from a set of component-signals, comprises selecting the plurality of the component-signals to represent an identification of the cell.

Paragraph 9. A method according to paragraph 1, wherein the selecting the one or more of the plurality of the blocks of resource elements and the one or more of the time units to transmit the component-signal, comprises selecting one or more of the plurality of the blocks of resource elements for each of a plurality of the time units in accordance with a frequency hopping pattern.

Paragraph 10. A method of Claim 9, wherein the frequency hopping pattern is determined by an identification of the cell.

Paragraph 11. A method according to any of paragraphs 1 to 10, wherein each of the component-signals comprises the sequence of signal samples, each of the component-signals having a low cross-correlation with each of the other signal-components of the set of signal-components.

Paragraph 12. A method according to any of paragraphs 1 to 10, wherein the sequence of signal samples is formed from a Zadoff-Chu sequence and each of the signal samples is formed from a coefficient of the Zadoff-Chu sequence.

Paragraph 13. A method according to paragraph 12, wherein a plurality of the component-signals in the set of component-signals is formed from the same Zadoff-Chu sequence, cyclically shifted with respect to each other.

Paragraph 14. A method according to paragraph 1, wherein the number of the plurality of component signals are selected in accordance with a relative indication of radio conditions affecting a radio signal path loss, the number being greater for a greater radio signal path loss.

Paragraph 15. An infrastructure equipment forming part of a wireless communications network for communicating with one or more communications devices, the infrastructure equipment comprising
  transmitter circuitry configured to transmit signals via a wireless access interface formed by the infrastructure equipment,
  receiver circuitry configured to receive signals transmitted by the one or more communications devices via the infrastructure equipment, and
  controller circuitry configured to control the transmitter and the receiver circuitry, the controller circuitry being configured
  to determine that a downlink signal should be transmitted to a communications device to provide information for the communications device,
  to form the downlink signal for transmission via a wireless access interface, the wireless access interface comprising in a frequency dimension resource elements, each of the resource elements for carrying a sub-carrier of an Orthogonal Frequency Division Multiplexed, OFDM, symbol, the resource elements being formed in the frequency dimension into blocks of resource elements, and in a time dimension the wireless access interface is divided into time units, each of the time units for carrying a number of OFDM symbols, and
  controlling the transmitter to transmit the downlink signal from the infrastructure equipment to the communications device, wherein the controller is configured
  to form the downlink signal by selecting a plurality of component-signals from a set of component-signals, each of the component-signals from the set of component-signals being formed from a sequence of signal samples for transmission in one of the blocks of resource elements and in one of the time units by the number of OFDM symbols, each of the component-signals being detectable by a narrow bandwidth receiver, and
  to select for each of the plurality of component-signals one of the blocks of resource elements and one of the time units to transmit the component-signal, and
  to control the transmitter to transmit the plurality of selected component signals in the selected blocks of resource elements as a wider bandwidth signal.

Paragraph 16. An infrastructure equipment according to paragraph 15, wherein one or both of the plurality of component-signals selected from the set of component-signals and a corresponding plurality of the blocks of resource elements and the one or more of the time units to transmit the plurality of component-signals are selected to reduce co-channel interference from at least one other signal formed from a plurality of component-signals from the set of component-signals transmitted in the blocks of resource elements of the wireless access interface.

Paragraph 17. An infrastructure equipment according to paragraph 16, wherein the controller circuitry is configured in combination with the transmitter circuitry to transmit the downlink signal to the communications device operating within a first cell of the wireless communications network formed by the infrastructure equipment which first cell is different to a second cell formed by a second infrastructure equipment from which the at least one other signal is transmitted.

Paragraph 18. An infrastructure equipment according to paragraph 16, wherein the controller circuitry is configured in combination with the transmitter circuitry to transmit the downlink signal to the communications device operating within a cell of the wireless communications network formed by the infrastructure equipment and from which the at least one other signal is transmitted, and the communications device to which the downlink signal is transmitted forms part of a first group of communications devices and the other signal being transmitted to one or more communications devices forming another group of communications devices.

Paragraph 19. An infrastructure equipment according to paragraph 16, 17 or 18, wherein the controller circuitry is configured to select one of the blocks of resource elements and one of the time units in which one of the plurality of component-signals of the at least one other signal is not transmitted, the selecting of the blocks of resource elements being mutually exclusive from the blocks of resource elements of the wireless access interface in which the plurality of component-signals of the at least one other signal is transmitted.

Paragraph 20. An infrastructure equipment according to paragraph 16, 17 or 18, wherein the controller circuitry is configured to select one of the blocks of resource elements and one of the time units which is the same as one of the blocks of resource elements in which one of the plurality of component-signals of the at least one other signal is transmitted, and to select the component-signals to be a different one of the component-signals which is transmitted in the same blocks of resource elements and the same time unit to the component-signal of the at least one other signal.

Paragraph 21. An infrastructure equipment according to paragraph 19, wherein the controller circuitry is configured to select the component-signals to be a different one of the component-signals which is transmitted in the same blocks of resource elements and the same time unit to the component-signal of the at least one other signal.

Paragraph 22. An infrastructure equipment according to any of paragraphs 15 to 21, wherein the controller circuitry is configured to select the plurality of the component-signals to represent an identification of the cell.

Paragraph 23. An infrastructure equipment according to paragraph 15, wherein the controller circuitry is configured to select one or more of the plurality of the blocks of resource elements for each of a plurality of the time units in accordance with a frequency hopping pattern.

Paragraph 24. An infrastructure equipment of Claim 23, wherein the frequency hopping pattern is determined by an identification of the cell.

Paragraph 25. An infrastructure equipment according to any of paragraphs 15 to 24, wherein each of the component-signals comprises the sequence of signal samples, each of the component-signals having a low cross-correlation with each of the other signal-components of the set of signal-components.

Paragraph 26. An infrastructure equipment according to any of paragraphs 15 to 24, wherein the sequence of signal samples is formed from a Zadoff-Chu sequence and each of the signal samples is formed from a coefficient of the Zadoff-Chu sequence.

Paragraph 27. An infrastructure equipment according to paragraph 26, wherein a plurality of the component-signals in the set of component-signals is formed from the same Zadoff-Chu sequence, cyclically shifted with respect to each other.

Paragraph 28. An infrastructure equipment according to paragraph 15, wherein the number of the plurality of component signals are selected in accordance with a relative indication of radio conditions affecting a radio signal path loss, the number being greater for a greater radio signal path loss.

Paragraph 29. A method of receiving a downlink signal at a user equipment operating with a wireless communications network, the method comprising
receiving a downlink signal transmitted via a wireless communications network formed by the wireless communications network, the wireless access interface comprising in a frequency dimension resource elements, each of the resource elements for carrying a sub-carrier of an Orthogonal Frequency Division Multiplexed, OFDM, symbol, the resource elements being formed in the frequency dimension into blocks of resource elements, and in a time dimension the wireless access interface is divided into time units, each of the time units for carrying a number of OFDM symbols, the downlink signal comprising a plurality of component-signals selected from a set of component-signals, each of the component-signals from the set of component-signals being formed from a sequence of signal samples transmitted in one of the blocks of resource elements and in one of the time units by the number of OFDM symbols, each of the component-signals being detectable by a narrower bandwidth receiver, and each of the plurality of component-signals is transmitted in one of the blocks of resource elements and one of the time units, and the plurality of selected component signals is received from the selected blocks of resource elements as a wider bandwidth signal.

Paragraph 30. A user equipment for operating with a wireless communications network, the user equipment comprising
receiver circuitry configured to receive a downlink signal transmitted via a wireless access interface formed by the wireless communications network, the wireless access interface comprising in a frequency dimension resource elements, each of the resource elements for carrying a sub-carrier of an Orthogonal Frequency Division Multiplexed, OFDM, symbol, the resource elements being formed in the frequency dimension into blocks of resource elements, and in a time dimension the wireless access interface is divided into time units, each of the time units for carrying a number of OFDM symbols, the downlink signal comprising a plurality of component-signals selected from a set of component-signals, each of the component-signals from the set of component-signals being formed from a sequence of signal samples transmitted in one of the blocks of resource elements and in one of the time units by the number of OFDM symbols, each of the component-signals being detectable by a narrower bandwidth receiver, and each of the plurality of component-signals is transmitted in one of the blocks of resource elements and one of the time units, the plurality of selected component signals being received in the selected blocks of resource elements as a wider bandwidth signal.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170732, "New WID on Even further enhanced MTC for LTE," Ericsson, Qualcomm, 3GPP TSG RAN Meeting #75, Dubrovnik, Croatia, Mar. 6-9, 2017.
[4] RP-170852, "New WID on Further NB-IoT enhancements," Huawei, HiSilicon, Neul, 3GPP TSG RAN Meeting #75, Dubrovnik, Croatia, Mar. 6-9, 2017.
[5] Holma H. and Toskala A, "LTE for UMTS OFDMA and SC-FDMA based radio access", John Wiley and Sons, 2009.
[6] 3GPP TS 36.304 version 14.2.0 Release 14.
[7] 3GPP TS 36.321 version 13.5.0 Release 13.

[8] C. Hambeck, et al., "A 2.4 μW Wake-up Receiver for wireless sensor nodes with −71 dBm sensitivity", in IEEE Proceeding International Symposium of Circuits and Systems (ISCAS), 2011, pp. 534-537.
[9] N. S. Maxloum, O. Edfors, "Performance Analysis and Energy Optimization of Wake-Up Receiver Schemes for Wireless Low-Power Applications," IEEE Transactions on Wireless Communications, December 2014.
[10] European patent application no. 17169577.8.
[11] US patent application, publication no. US 2017/026219 A1.
[12] US patent application, publication no. US 2017/026220 A1.
[13] US patent application, publication no. US 2017/026221 A1.
[14] R1-1708311, "Idle Mode Power Efficiency Reduction," Sierra Wireless, RAN1 #89.
[15] European patent application no. 17186065.3
[16] R1-1719463 HW
[17] R1-1719728 ZTE
[18] R1-1719875 LG
[19] R1-1720417, QC
[20] R1-1719725, ZTE
[21] European patent application no. 17202451.5.

The invention claimed is:

1. A communications device for operating with a wireless communications network, the communications device comprising:
circuitry configured to receive a downlink signal transmitted via a wireless access interface formed by the wireless communications network, the wireless access interface comprising in a frequency dimension resource elements, each of the resource elements for carrying a sub-carrier of an Orthogonal Frequency Division Multiplexed (OFDM) symbol, the resource elements being formed in the frequency dimension into blocks of resource elements, and in a time dimension the wireless access interface is divided into time units, each of the time units for carrying a number of OFDM symbols, the downlink signal comprising a plurality of component-signals selected from a set of component-signals, each of the component-signals from the set of component-signals being formed from a sequence of signal samples transmitted in one of the blocks of resource elements and in one of the time units by the number of OFDM symbols, each of the component-signals being detectable by a narrower bandwidth receiver, and each of the plurality of component-signals is transmitted in one of the blocks of resource elements and one of the time units, the plurality of selected component signals being received in the selected blocks of resource elements as a wider bandwidth signal.

2. The communications device of claim 1, wherein one or both of the plurality of component-signals selected from the set of component-signals and a corresponding plurality of the blocks of resource elements and the one or more of the time units to transmit the plurality of component-signals are selected to reduce co-channel interference from at least one other signal formed from a plurality of component-signals from the set of component-signals transmitted in the blocks of resource elements of the wireless access interface.

3. The communications device of claim 2, wherein the communications device is configured to receive the downlink signal while operating within a first cell of the wireless communications network that is different from a second cell formed by the wireless communications network from which the at least one other signal is transmitted.

4. The communications device of claim 2, wherein the communications device is configured to receive the downlink signal while operating within a cell of the wireless communications network and from which the at least one other signal is transmitted.

5. The communications device of claim 4, wherein the communications device forms part of a first group of communications devices and the other signal is transmitted to one or more communications devices forming part of another group of communications devices.

6. The communications device of claim 2, wherein the selecting for each of the plurality of component-signals the blocks of resource elements and one of the time units to transmit the component-signal, comprises selecting one of the blocks of resource elements and one of the time units in which one of the plurality of component-signals of the at least one other signal is not transmitted.

7. The communications device of claim 6, wherein the selecting of the blocks of resource elements is mutually exclusive from the blocks of resource elements of the wireless access interface in which the plurality of component-signals of the at least one other signal is transmitted.

8. The communications device of claim 2, wherein the selecting for each of the plurality of component-signals the block of resource elements and the one or more of the time units to transmit the component-signal, comprises selecting one of the blocks of resource elements and one of the time units which is the same as one of the blocks of resource elements in which one of the plurality of component-signals of the at least one other signal is transmitted.

9. The communications device of claim 8, wherein the selecting the plurality of component-signals from the set of component-signals comprises selecting the component-signals to be a different one of the component-signals which is transmitted in the same blocks of resource elements and the same time unit to the component-signal of the at least one other signal.

10. The communications device of claim 7, wherein the selecting the plurality of component-signals from the set of component-signals comprises selecting the component-signals to be a different one of the component-signals which is transmitted in the same blocks of resource elements and the same time unit to the component-signal of the at least one other signal.

11. The communications device of claim 1, wherein the selecting the plurality of component-signals from a set of component-signals, comprises selecting the plurality of the component-signals to represent an identification of a cell.

12. The communications device of claim 1, wherein the selecting the one or more of the plurality of the blocks of resource elements and the one or more of the time units to transmit the component-signal, comprises selecting one or more of the plurality of the blocks of resource elements for each of a plurality of the time units in accordance with a frequency hopping pattern.

13. The communications device of claim 12, wherein the frequency hopping pattern is determined by an identification of a cell.

14. The communications device of claim 1, wherein
each of the component-signals comprises the sequence of signal samples, each of the component-signals having a low cross-correlation with each of the other signal-components of the set of signal-components.

15. The communications device of claim 14, wherein
the sequence of signal samples is formed from a Zadoff-Chu sequence and each of the signal samples is formed from a coefficient of the Zadoff-Chu sequence.

16. The communications device of claim 15, wherein
a plurality of the component-signals in the set of component-signals is formed from the same Zadoff-Chu sequence, cyclically shifted with respect to each other.

17. The communications device of claim 1, wherein
the number of the plurality of component signals are selected in accordance with a relative indication of radio conditions affecting a radio signal path loss, the number being greater for a greater radio signal path loss.

18. A method performed by a communications device for operating with a wireless communications network, the method comprising:
receiving a downlink signal transmitted via a wireless access interface formed by the wireless communications network, the wireless access interface comprising in a frequency dimension resource elements, each of the resource elements for carrying a sub-carrier of an Orthogonal Frequency Division Multiplexed (OFDM) symbol, the resource elements being formed in the frequency dimension into blocks of resource elements, and in a time dimension the wireless access interface is divided into time units, each of the time units for carrying a number of OFDM symbols, the downlink signal comprising a plurality of component-signals selected from a set of component-signals, each of the component-signals from the set of component-signals being formed from a sequence of signal samples transmitted in one of the blocks of resource elements and in one of the time units by the number of OFDM symbols, each of the component-signals being detectable by a narrower bandwidth receiver, and each of the plurality of component-signals is transmitted in one of the blocks of resource elements and one of the time units, the plurality of selected component signals being received in the selected blocks of resource elements as a wider bandwidth signal.

19. The method of claim 18, wherein
one or both of the plurality of component-signals selected from the set of component-signals and a corresponding plurality of the blocks of resource elements and the one or more of the time units to transmit the plurality of component-signals are selected to reduce co-channel interference from at least one other signal formed from a plurality of component-signals from the set of component-signals transmitted in the blocks of resource elements of the wireless access interface.

20. Circuitry for a communications device configured to operate with a wireless communications network, the circuitry configured to:
receive a downlink signal transmitted via a wireless access interface formed by the wireless communications network, the wireless access interface comprising in a frequency dimension resource elements, each of the resource elements for carrying a sub-carrier of an Orthogonal Frequency Division Multiplexed (OFDM) symbol, the resource elements being formed in the frequency dimension into blocks of resource elements, and in a time dimension the wireless access interface is divided into time units, each of the time units for carrying a number of OFDM symbols, the downlink signal comprising a plurality of component-signals selected from a set of component-signals, each of the component-signals from the set of component-signals being formed from a sequence of signal samples transmitted in one of the blocks of resource elements and in one of the time units by the number of OFDM symbols, each of the component-signals being detectable by a narrower bandwidth receiver, and each of the plurality of component-signals is transmitted in one of the blocks of resource elements and one of the time units, the plurality of selected component signals being received in the selected blocks of resource elements as a wider bandwidth signal.

* * * * *